United States Patent
Takahashi et al.

(10) Patent No.: US 10,574,121 B2
(45) Date of Patent: Feb. 25, 2020

(54) STATOR FOR ROTARY ELECTRIC MACHINE

(71) Applicant: HONDA MOTOR CO., LTD., Tokyo (JP)

(72) Inventors: Tadanobu Takahashi, Saitama (JP); Tomotaka Iki, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 238 days.

(21) Appl. No.: 15/679,299

(22) Filed: Aug. 17, 2017

(65) Prior Publication Data
US 2018/0069459 A1 Mar. 8, 2018

(30) Foreign Application Priority Data

Sep. 2, 2016 (JP) .................................. 2016-171615

(51) Int. Cl.
*H02K 15/02* (2006.01)
*H02K 15/04* (2006.01)
(Continued)

(52) U.S. Cl.
CPC ............. *H02K 15/024* (2013.01); *H02K 1/16* (2013.01); *H02K 3/12* (2013.01); *H02K 15/04* (2013.01); *H02K 3/50* (2013.01); *H02K 2203/09* (2013.01)

(58) Field of Classification Search
CPC .......... H02K 15/024; H02K 1/16; H02K 3/12; H02K 15/04; H02K 3/50; H02K 2203/09
(Continued)

(56) References Cited

U.S. PATENT DOCUMENTS

2007/0228848 A1 10/2007 Wiker et al.
2013/0020891 A1* 1/2013 Kishi ................... H02K 3/12
310/71
(Continued)

FOREIGN PATENT DOCUMENTS

CN 103733482 A 4/2014
CN 105914913 A 8/2016
(Continued)

OTHER PUBLICATIONS

Mar. 5, 2019, Chinese Office Action issued for related CN Application No. 201710767523.2.

*Primary Examiner* — Jeffrey A Gblende
*Assistant Examiner* — Bart Iliya
(74) *Attorney, Agent, or Firm* — Paratus Law Group, PLLC

(57) ABSTRACT

A base plate assembly of a stator for an electric rotary machine has: plural first coil units disposed in a circumferential direction such that an inner side connection coil and an outer side connection coil are integrally formed with a first divided plate and the adjacent first divided plates are overlapped with each other in an axial direction; at least one second coil unit provided between the adjacent first coil units, in which the inner side connection coil is integrally formed with a second divided plate provided to extend on a plane on which the inner side connection coil is disposed; and at least one third coil unit provided between the adjacent first coil units, in which the outer side connection coil is integrally formed with a third divided plate provided to extend on a plane on which the outer side connection coil is disposed.

5 Claims, 24 Drawing Sheets

(51) Int. Cl.
  *H02K 3/12* (2006.01)
  *H02K 1/16* (2006.01)
  *H02K 3/50* (2006.01)

(58) Field of Classification Search
  USPC ......... 310/71, 179, 183, 184, 190, 188, 198,
  310/200, 210
  See application file for complete search history.

(56) References Cited

U.S. PATENT DOCUMENTS

| | | |
|---|---|---|
| 2013/0020901 A1 | 1/2013 | Kishi et al. |
| 2014/0184011 A1 | 7/2014 | Kaimori et al. |
| 2016/0248289 A1 | 8/2016 | Tamura |
| 2017/0025907 A1 | 1/2017 | Iki |
| 2017/0025913 A1* | 1/2017 | Nagahiro ................ H02K 3/12 |
| 2017/0040859 A1* | 2/2017 | Langlard ................ H02K 3/12 |

FOREIGN PATENT DOCUMENTS

| | | |
|---|---|---|
| JP | 2013-027174 | 2/2013 |
| WO | WO 2015/151615 A1 | 10/2015 |

\* cited by examiner

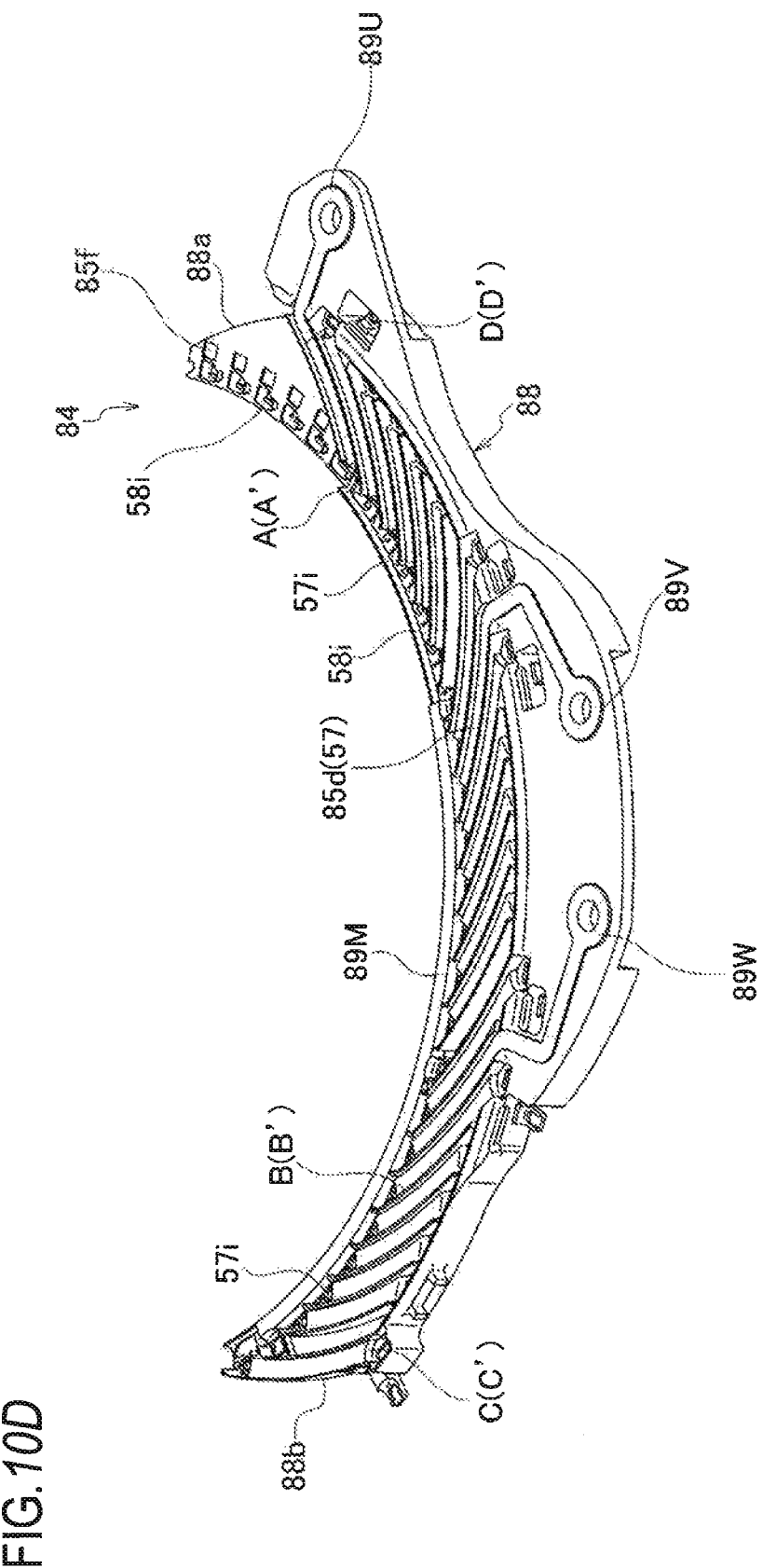

STATOR FOR ROTARY ELECTRIC MACHINE

CROSS-REFERENCE TO RELATED APPLICATION(S)

This application claims priority from Japanese Patent Application No. 2016-171615 filed on Sep. 2, 2016, the entire contents of which are incorporated herein by reference.

FIELD

The present invention relates to a stator for a rotary electric machine.

BACKGROUND

In recent years, as a stator for a rotary electric machine, rotary electric machines have been proposed which employ segment coils. For example, a stator for a rotary electric machine described in JP-A-2013-27174 includes a stator core assembly formed by inserting slot coils into slots in the stator core, and a base plate assembly formed by housing connection coils that connect slot coils of the same phase of the stator core in a base plate. The connection coils are joined to the slot coils of the same phase that are inserted into the slots in the stator core and an inner connection coil and an outer connection coil configuring the connection coil are joined to each other by a pin.

In the stator for a rotary electric machine described in JP-A-2013-27174, since the inner connection coil and the outer connection coil are separately provided, a process of joining the inner connection coil to the outer connection coil with the pin is required.

In contrast, there is provided a stator for a rotary electric machine described in WO. 2015/151615 in which an inner connection coil and an outer connection coil configuring a connection coil are funned by press-forming a single sheet-like conductor or the like, the connection coils are uniformly arranged in a circumferential direction, and then a base plate and the connection coil are integrally molded by a resin mold.

However, in the stator for a rotary electric machine described in WO. 2015/151615, since the annular base plate and the connection coils are molded together, a large scale manufacturing facility is required and further, it is difficult to manufacture a relatively large base plate at once while maintaining the position accuracy of the connection coil.

SUMMARY

The invention is to provide a stator for a rotary electric machine that can be easily assembled without requiring a large scale manufacturing facility.

The invention provides following aspects (1) to (5).

(1) A stator for an electric rotary machine (e.g., a stator 10) includes:

a stator core (e.g., a stator core 20) having plural slots (e.g., slots 21); and a coil (e.g., a coil 90) attached to the stator core, wherein the coil has plural slot coils (e.g., a first coil bar 34 and a second coil bar 54) inserted into the slots, and plural connection coils (e.g., a first outer side connection coil 37, a first inner side connection coil 38, a second outer side connection coil 57, and a second inner side connection coil 58) connecting the slot coils on an axially, outer side from an axial end surface of the stator core, the connection coil has an inner side connection coil (e.g., the first inner side connection coil 38 and the second inner side connection coil 58) and an outer side connection coil (e.g., the first outer side connection coil 37 and the second outer side connection coil 57) disposed to cross each other on planes which are disposed in different axial positions, a base plate assembly (e.g., a right inner side base plate assembly 30, a right outer side base plate assembly 50, a left inner side base plate assembly 70, and a left outer side base plate assembly 80) is provided on at least axial one end side of the stator core, and the base plate assembly has plural first coil units (e.g., a first right inner side coil unit 35, a first right outer side coil unit 55, a first left inner side coil unit 71, and a first left outer side coil unit 81) disposed in a circumferential direction such that the inner side connection coil and the outer side connection coil are integrally formed with a first divided plate (e.g., a first right inner side divided plate 36, a first right outer side divided plate 56, a first left inner side divided plate 75, and a first left outer side divided plate 85) and the adjacent first divided plates are overlapped with each other in an axial direction, at least one second coil unit (e.g., a second right inner side coil unit 41, a second right outer side coil unit 61, a second left inner side coil unit 72, and a second left outer side coil unit 82) provided between the adjacent first coil units, in which the inner side connection coil is integrally formed with a second divided plate (e.g., a second right inner side divided plate 42, a second right outer side divided plate 62, a second left inner side divided plate 76, and a second left outer side divided plate 86) provided to extend on the plane on which the inner side connection coil is disposed, and at least one third coil unit (e.g., a third right inner side coil unit 45, a third right outer side coil unit 65, a third left inner side coil unit 73, and a third left outer side coil unit 83) provided between the adjacent first coil units, in which the outer side connection coil is integrally formed with a third divided plate (e.g., a third right inner side divided plate 46, a third right outer side divided plate 66, a third left inner side divided plate 77, and a third left outer side divided plate 87) provided to extend on the plane on which the outer side connection coil is disposed.

(2) The stator for an electric rotary machine according to aspect (1), wherein a shape formed by combining the second divided plate and the third divided plate is substantially the same as a shape of the first divided plate.

(3) The stator for an electric rotary machine according to aspect (1) or (2), wherein the base plate assembly is provided on both axial sides of the stator core.

(4) The stator for an electric rotary machine according to aspect (3), wherein the slot coils are integrally formed with the first to third coil units of the base plate assembly provided on axial other end side of the stator core.

(5) The stator for an electric rotary machine according to any one of aspects (1) to (4), wherein in the first divided plate, an outer side groove portion (e.g., coil grooves 36d, 56d, 75d, and 85d) is formed such that the outer side connection coil is exposed to an outer surface and an inner side groove portion (e.g., coil grooves 36c, 56c, 75c, and 85c) is formed such that the inner side connection coil is exposed to an inner surface, in the second divided plate, an inner side groove portion (e.g., the coil grooves 36c, 56c, 75c, and 85c) is formed such that the inner side connection coil is exposed to an inner surface, and in the third divided plate, an outer side groove portion (e.g., the coil grooves 36d, 56d, 75d, and 85d) is formed such that the outer side connection coil is exposed to an outer surface.

According to the aspect (1), since the base plate assembly is made up of the plural first coil units, the second coil unit, and the third coil unit, compared to the case in which the base plate is molded at once as in the related art, a large scale manufacturing facility is not required and the base plate assembly can be easily manufactured.

In the case where the plural first coil units are simply disposed in the circumferential direction, when the last first coil unit is disposed, the last first coil unit interferes with the first coil unit that is first disposed and thus the last first coil unit cannot be assembled. However, the second coil unit which is provided to extend on the plane on which the inner side connection coil is disposed is disposed before the first coil unit is disposed, and the third coil unit which is provided to extend on the plane on which the outer side connection coil is disposed is last disposed, thereby making it possible to easily assemble the base plate assembly.

According to the aspect (2), when the third coil unit is disposed to be overlapped with the second coil unit assembled in advance, the third coil unit and the second coil unit have the same shape as the shape of the first coil unit. Thus, the base plate assembly is arranged well.

According to the aspect (3), since the base plate assembly is provided at the both axial ends of the stator core, the stator for a rotary electric machine can be easily manufactured while sharing the constitution components.

According to the aspect (4), since the slot coils are integrally formed with the first to third coil units provided on the axial other end side of the stator core, connection processing is not required after the connection coils and the slot coils are assembled and thus the stator for a rotary electric machine can be easily manufactured.

According to the aspect (5), since the outer side connection coil and the inner side connection coil are respectively exposed to the outer side groove portion and the inner side groove portion, the connection coils can be effectively cooled.

BRIEF DESCRIPTION OF DRAWINGS

FIG. 68 is a perspective view of a second right outer side coil assembly including a second right outer side coil unit and a second radially inner side coil bar;

FIG. 10D is a perspective view of a fourth left outer side coil unit;

DETAILED DESCRIPTION

Figure 1:
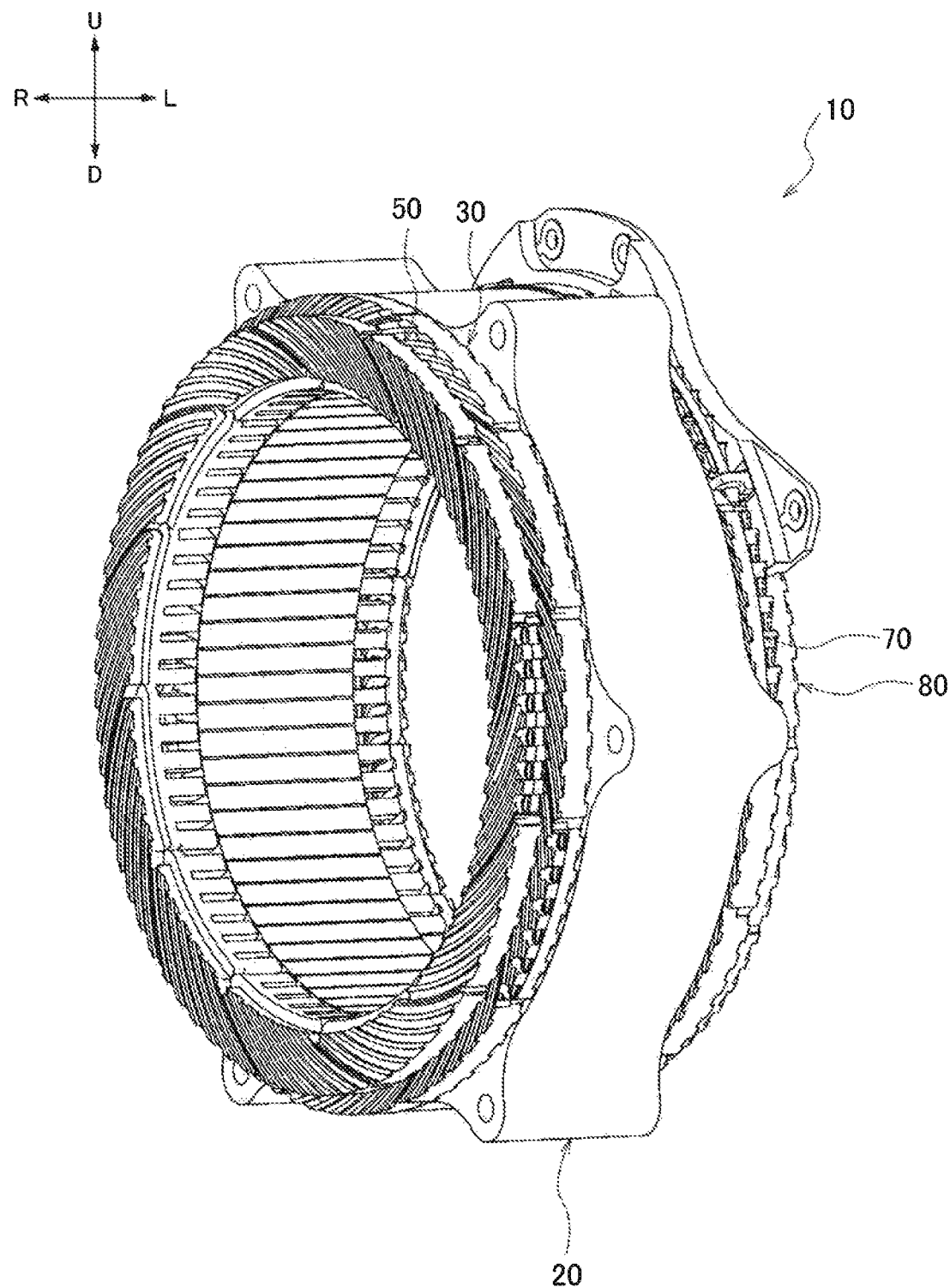
FIG. 1 is a right side perspective view of a stator for a rotary electric machine according to an embodiment of the invention.

Hereinafter, a stator for a rotary electric machine of an embodiment according to the invention will be described in detail based on the accompanying drawings. The drawings should be seen in a direction in which reference numerals given therein look proper.

1. Stator

Figure 2:
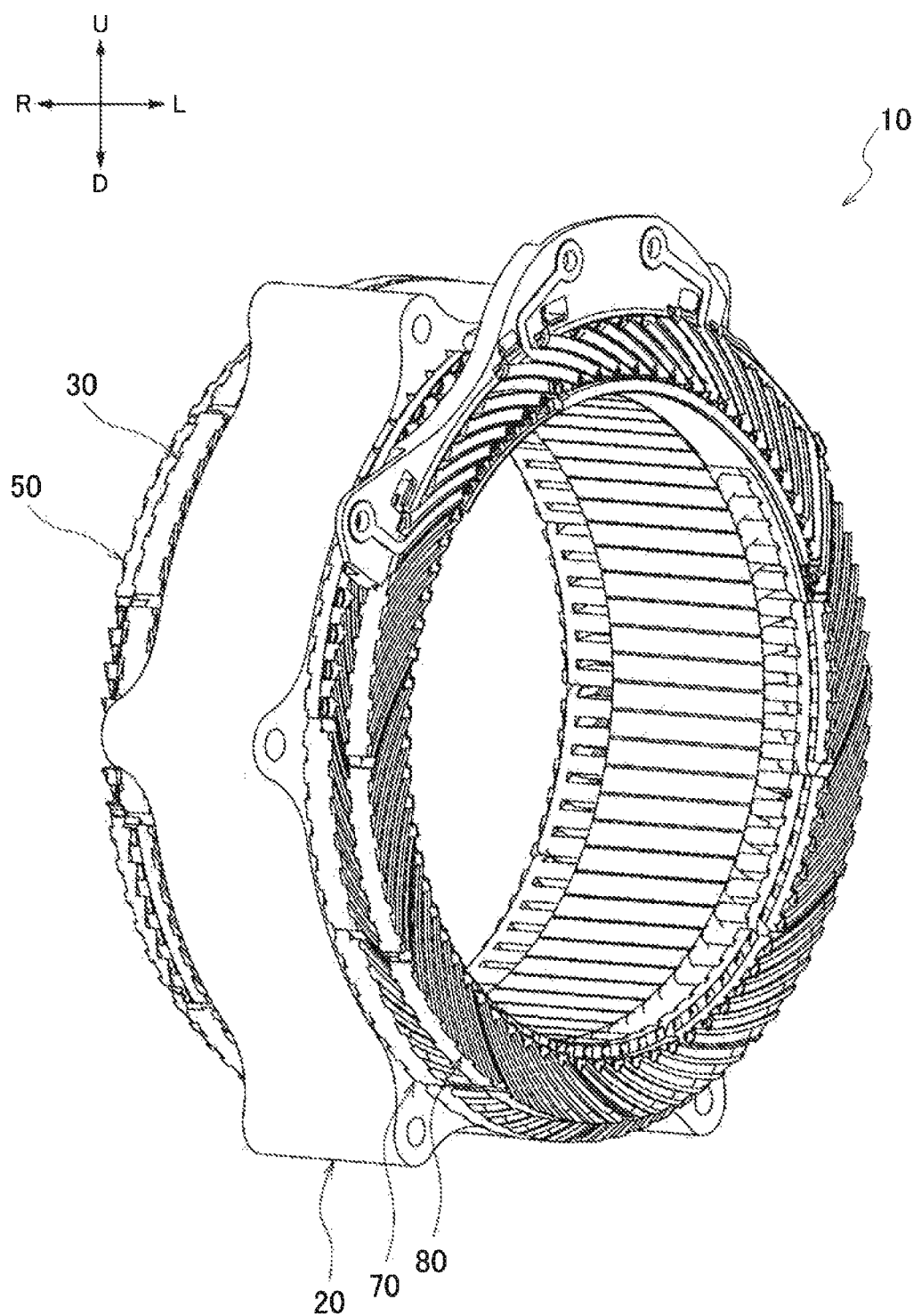
FIG. 2 is a left side perspective view of the stator for a rotary electric machine in FIG. 1.

As shown in FIGS. 1 and 2, a stator 10 for a rotary electric machine of this embodiment is a six-pair eight-turn double-slot type stator and includes a stator core 20, a right inner side base plate assembly 30 and a right outer side base plate assembly 50, and a left inner side base plate assembly 70 and a left outer side base plate assembly 80. Specifically, the right inner side base plate assembly 30 is disposed on an axially right side of the stator core 20, and the right outer side base plate assembly 50 is disposed on a further axially right side of the right inner side base plate assembly 30 in a laminated manner. The left inner side base plate assembly 70 is disposed on an axially left side of the stator core 20 and the left outer side base plate assembly 80 is disposed on a further axially left side of the left inner side base plate assembly 70 in a laminated manner.

2. Stator Core

Figure 3:
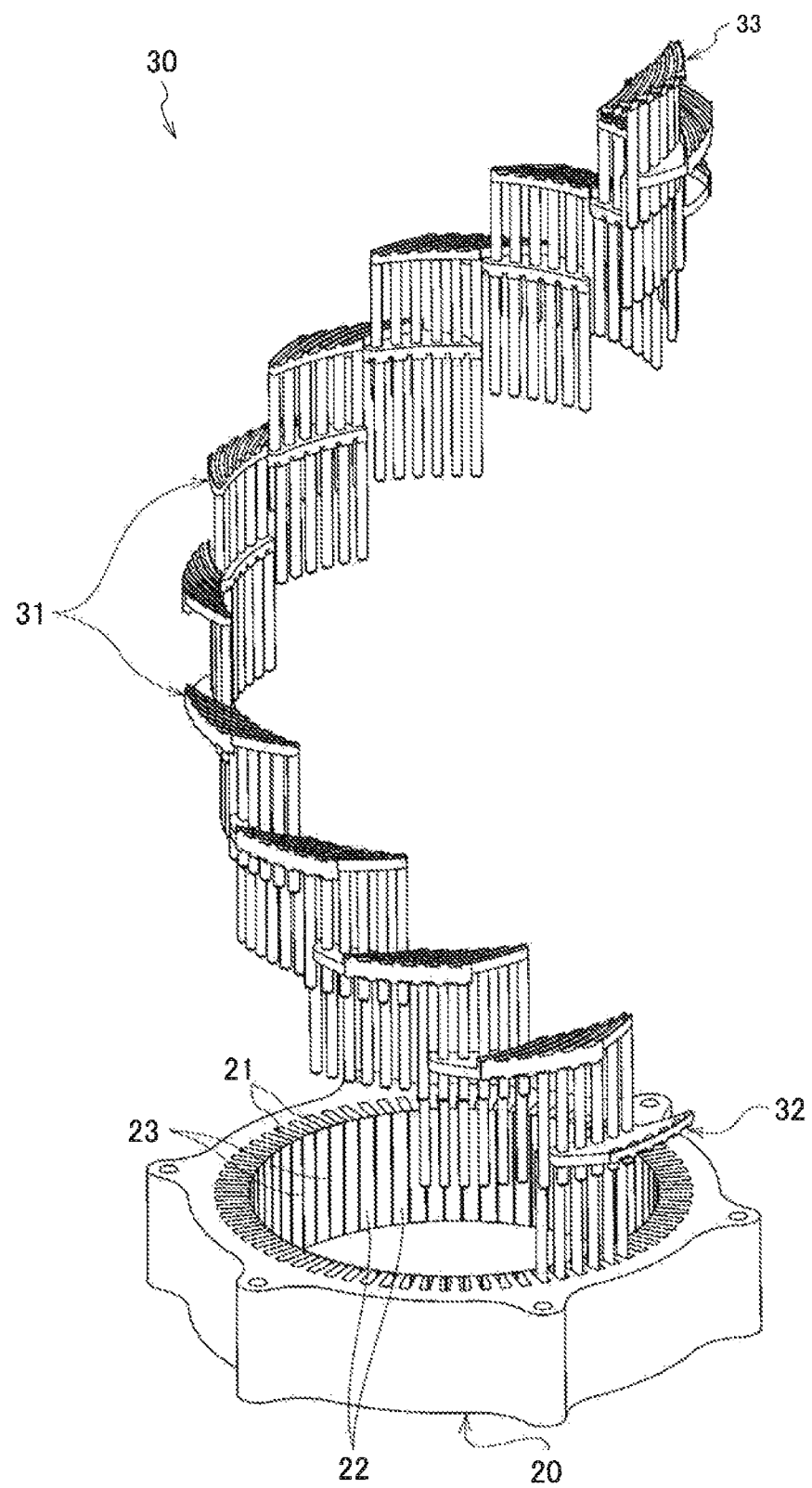
FIG. 3 is a perspective view illustrating a state in which a right inner side base plate assembly is assembled to a stator core.

As shown in FIG. 3, for example, the stator core 20 is formed of a lamination of plural silicon steel sheets which are punched out and includes 72 teeth 22, and 72 slots 21 each formed between adjacent teeth 22 and 22 on a radially inner side thereof. The slot 21 passes through the stator core 20 in the axial direction and is formed in a substantially elliptic shape which is elongated in a radial direction of the stator core 20 when viewed from the axial direction, and 72 opening portions 23 are opened to the inner circumferential surface of the stator core 20.

Figure 15:
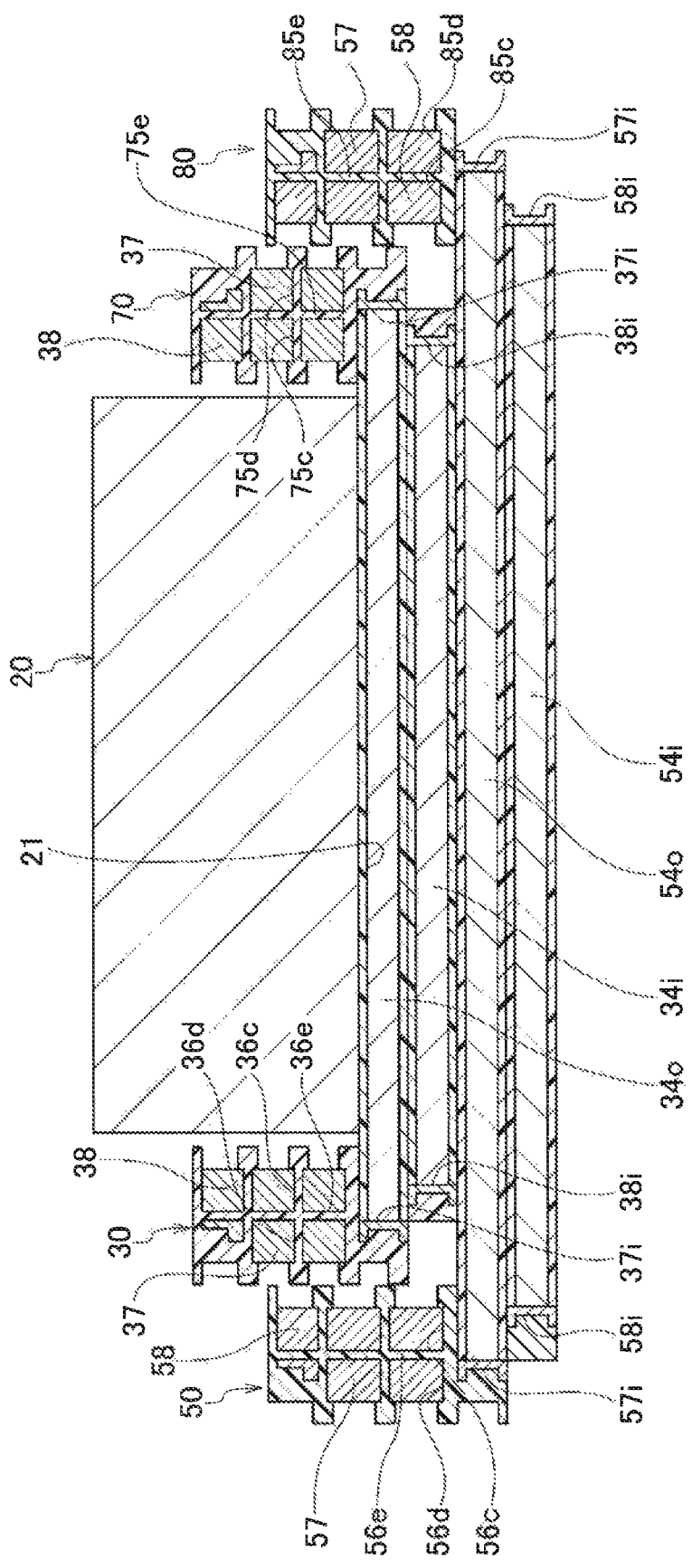
FIG. 15 is a cross-sectional view of the main part of the stator illustrated in FIG. 1.
Figure 16:
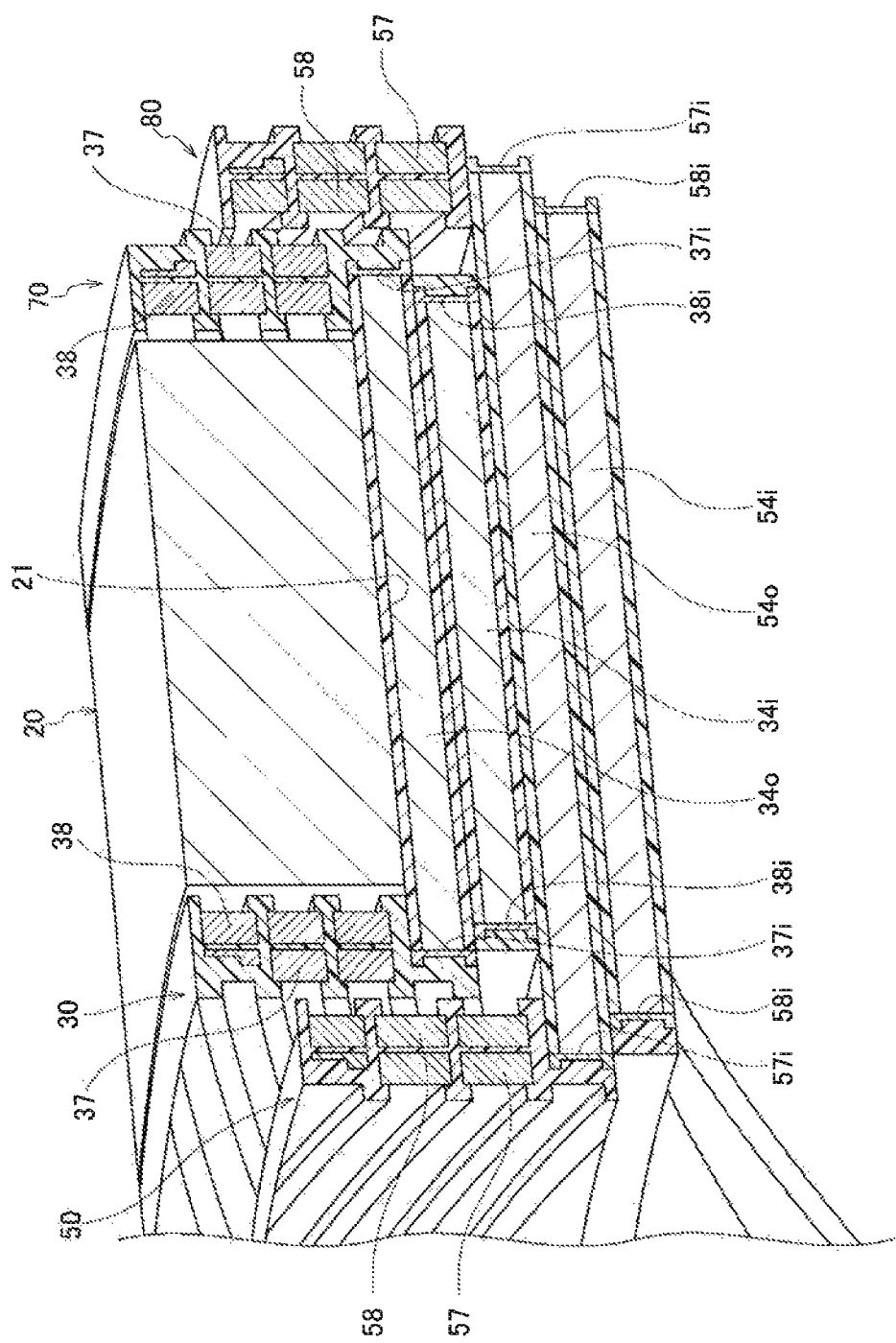
FIG. 16 is a perspective view of the cross-section of the main part in FIG. 15.

Referring to FIGS. 15 and 16, the slots 21 are each formed into a substantially elliptic shape such that a first radially outer side coil bar 34o, a first radially inner side coil bar 34i, a second radially outer side coil bar 54o, and a second radially inner side coil bar 54i, which will be described later, can be inserted in this order from the radially outer side thereof.

3. Right Inner Side Base Plate Assembly

The right inner side base plate assembly 30 includes 11 first right inner side coil assemblies 31, one second right inner side coil assembly 32, and one third right inner side coil assembly 33 and is disposed to be annularly assembled to the axially right side of the stator core 20.

3-1. First Right Inner Side Coil Assembly

Figure 4A:
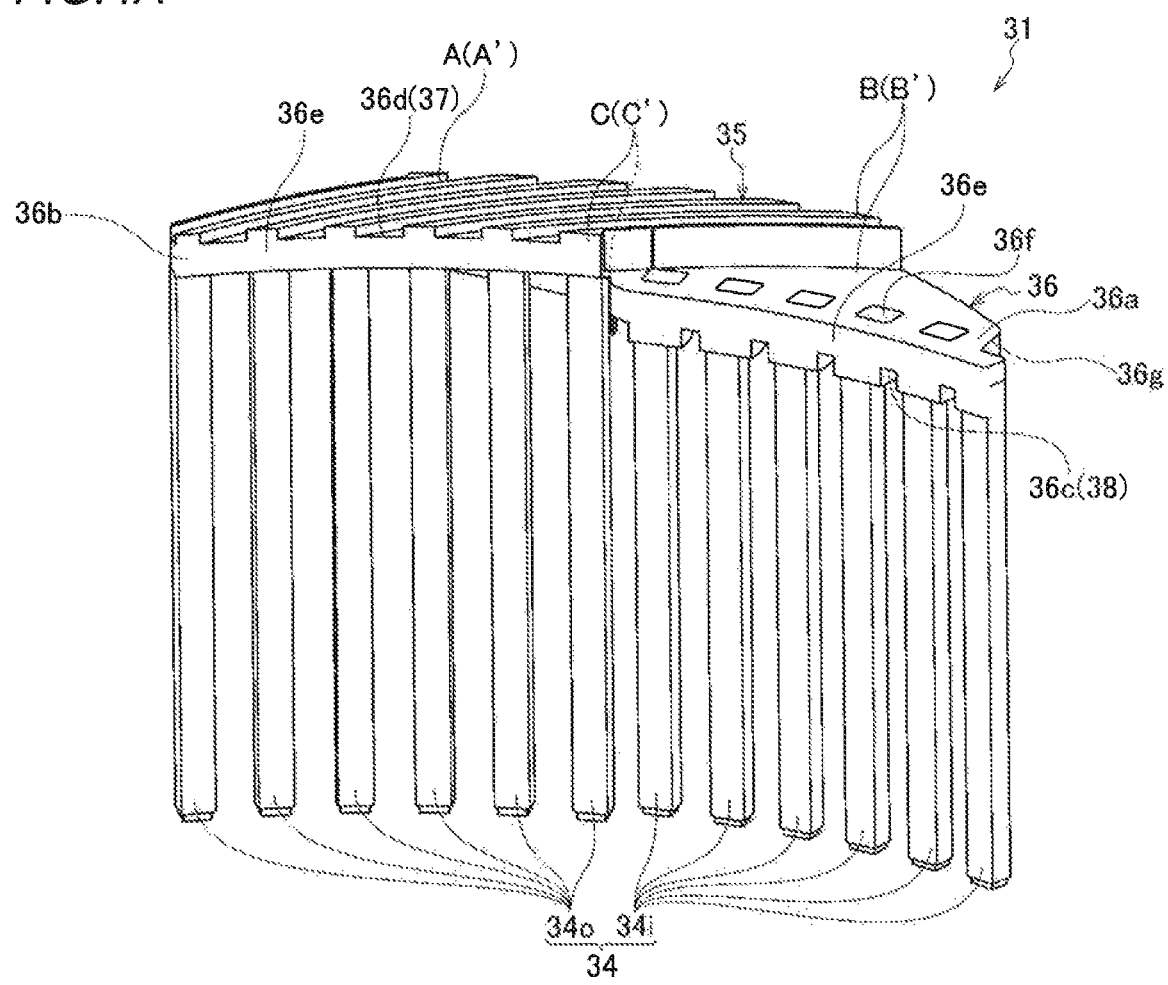
FIG. 4A is a perspective view of a first right inner side coil assembly including a first right inner side coil unit and a first coil bar.

As shown in FIG. 4A, the first right inner side coil assembly 31 is made up of a first coil bar 34 and a first right inner side coil unit 35.

The first coil bar 34 is made up of plural (six in the embodiment shown in the drawing) first radially outer side coil bars 34o and plural (six in the embodiment shown in the drawing) first radially inner side coil bars 34i. Referring to FIGS. 15 and 16, the length of the first radially outer side coil bar 34o is set to a length of a line connecting a first outer side connection coil 37 disposed on the outer side of the right inner side base plate assembly 30 and a first outer side connection coil 37 disposed on the outer side of the left inner side base plate assembly 70, which passes through the stator core 20. The length of the first radially inner side coil bar 34i is set to a length of a line connecting a first inner side connection coil 38 disposed on the inner side of the right inner side base plate assembly 30 and a first inner side connection coil 38 disposed on the inner side of the left inner side base plate assembly 70, which passes through the stator core 20. The first radially outer side coil bar 34o and the first radially inner side coil bar 34i are insulated from each other by covering the peripheries thereof by an insulating material which is injection molded such as a resin with both ends of each coil bar left uncovered.

The first right inner side coil unit 35 includes a first right inner side divided plate 36, plural (six in the embodiment shown in the drawing) first outer side connection coils 37, and plural (six in the embodiment shown in the drawing) first inner side connection coils 38.

The first right inner side divided plate 36 is made up of an inner side plate portion 36a which is formed in a substantial parallelogram plate shape falling in a counterclockwise direction, and an outer side plate portion 36b which is formed in a substantial parallelogram plate shape falling in a clockwise direction, and a part of the inner side plate portion 36a and a part of the outer side plate portion 36b are overlapped with each other and integrally formed. Specifically, in a state in which a substantially triangular region of the inner side plate portion 36a surrounded by A, B, and C, and a substantially triangular region of the outer side plate portion 36b surrounded by A', B', and C' shown in FIG. 4A are overlapped with each other, the inner side plate portion and the outer side plate portion are integrally formed.

Accordingly, in the region excluding the overlapped portion of the inner side plate portion 36a and the outer side plate portion 36b, a space for the thickness of the inner side plate portion 36a is formed on the inner surface side of the outer side plate portion 36h (the lower surface side in the drawing) and a space for the thickness of the outer side plate portion 36b is formed on the outer surface side of the inner side plate portion 36a.

Plural (six) coil grooves 36c having an approximately U-shaped cross section, which are opened to the inner surface, are formed on the inner surface side of the inner side plate portion 36a (the lower surface in the drawing) along involute curves extending in counterclockwise directions when viewed through the assembly from the axially outer side so as to lie close to one another. Plural (six) coil grooves 36d having an approximately U-shaped cross section, which are opened to the outer surface, are formed on the outer surface side of the outer side plate portion 36b (the upper surface in the drawing) along involute curves extending in directions opposite to the directions of the coil grooves 36c (clockwise directions) when viewed from the axially outer side so as to lie close to one another. That is, the coil grooves 36c and the coil grooves 36d are formed so as to cross one another on planes which are disposed in different axial positions.

Figure 11:
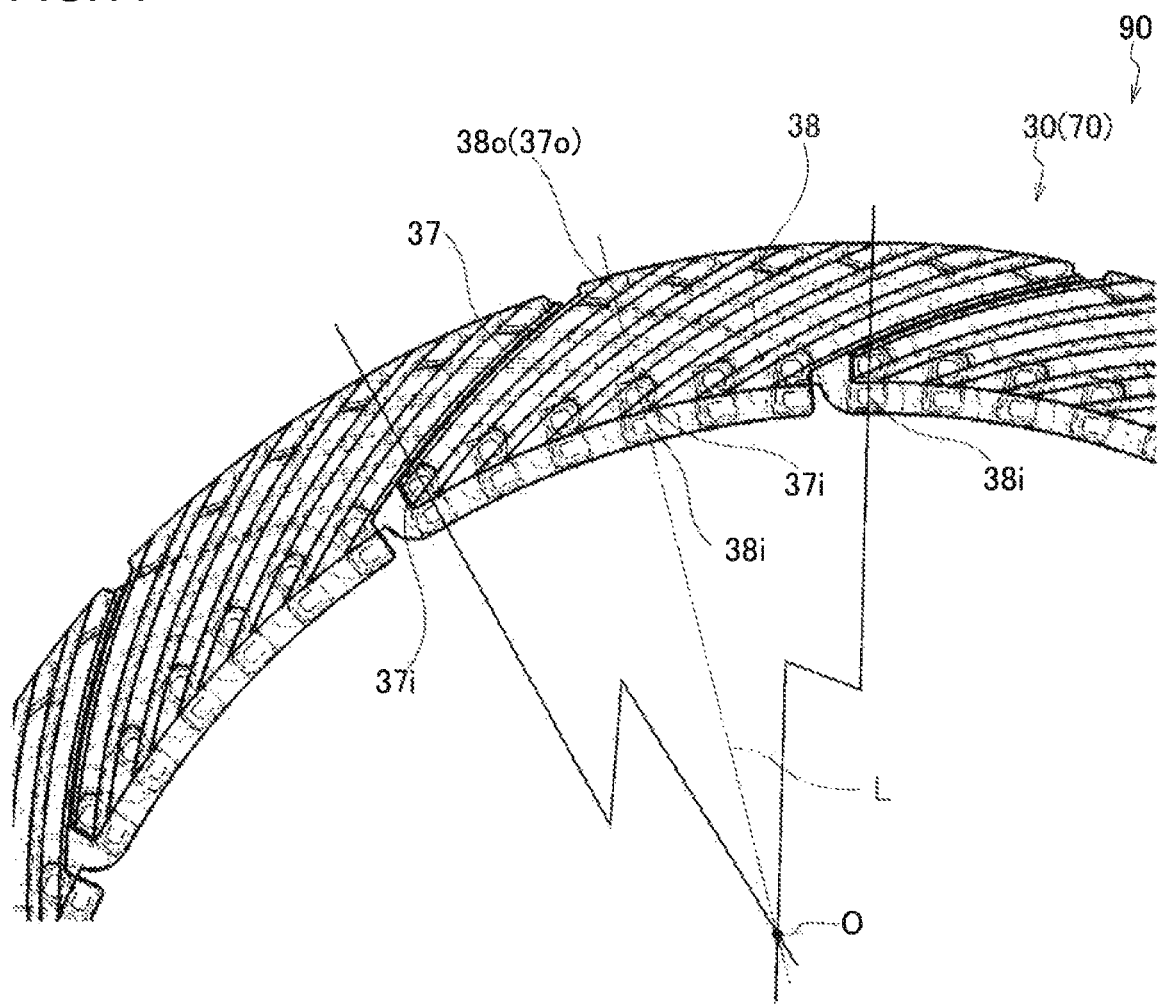
FIG. 11 is a partial side view of the right inner side base plate assembly and the left inner side base plate assembly when viewed from an axially outer side thereof.

The first inner side connection coils 38 are inserted into the coil grooves 36c and the first outer side connection coils 37 are inserted into the coil grooves 36d. In other words, the inner side plate portion 36a is provided to extend on a plane on which the first inner side connection coils 38 are disposed and the outer side plate portion 36b is provided to extend on a plane on which the first outer side connection coils 37 are disposed. Referring to FIG. 11, when the right inner side base plate assembly 30 is annularly assembled to the axially right side of the stator core 20, a radially outer end 37o of the first outer side connection coil 37 and a radially outer end 38o of the first inner side connection coil 38 are disposed on the same circumference around a center O of the right inner side base plate assembly 30 (stator core 20).

Each first inner side connection coil 38 is provided to extend to the radially outer end 38o located on an extension of a straight line L connecting a radially inner end 38i, another third radially inner end 38i from the radially inner end 38i in the counterclockwise direction, and the center O of the right inner side base plate assembly 30. The first outer side connection coil 37 is provided to extend to the radially outer end 37o located on an extension of a straight line L connecting a radially inner end 37i, another third radially inner end 37i from the radially inner end 37i in the clockwise direction, and the center O of the right inner side base plate assembly 30. That is, the radially inner ends 38i of the six first inner side connection coils 38 and the radially inner ends 37i of the six first outer side connection coils 37, which are separated from one another in the circumferential direction, are electrically connected in the inside of the first right inner side divided plate 36 respectively through the third radially outer ends 38*o* and the third radially outer ends 37*o* in the counterclockwise direction and in the clockwise direction.

The radial length of the first inner side connection coil 38 is set to be longer than the radial length of the first outer side connection coil 37, and the radially inner end 38*i* of the first inner side connection coil 38 is provided to extend to the radially inner side from the radially inner end 37*i* of the first outer side connection coil 37. Accordingly, the inner side plate portion 36*a* is also provided to extend to the radially inner side from the outer side plate portion 36*b*. Referring to FIGS. 15 and 16, respective one ends of each first radially inner side coil bar 34*i* are connected to the radially inner ends 38*i* of each first inner side connection coil 38. Respective one ends of each first radially outer side coil bar 34*o* are connected to the radially inner ends 37*i* of each first outer side connection coil 37.

Except that the predetermined radially outer end 38*o* of the first inner side connection coil 38 and the predetermined radially outer end 37*o* of the first outer side connection coil 37 are electrically connected, the first outer side connection coil 37 and the first inner side connection coil 38, the first outer side connection coils 37, and the first inner side connection coils 38 are separated by partition walls 36*e* of the first right inner side divided plate 36, whereby the connection coils are insulated. Further, plural (five in the drawing) through holes 36*f* are formed in the inner side plate portion 36*a* on the radially outer side of the first radially inner side coil bar 34*i* (radially inner end 38*i*).

The through holes 36*f* are holes for inserting the first radially outer side coil bars 34*o* of the adjacent first right inner side coil assembly 31, and are insulated from the first inner side connection coils 38 by the partition walls 36*e*. In other words, the first inner side connection coil 38 is formed so as to be bent to avoid the first radially outer side coil bar 34*o* (the radially inner end 37*i* of the first outer side connection coil 37) (refer to FIG. 11). A notched portion 36*g* formed in the end portion of the inner side plate portion 36*a* forms another through hole (36*f*) in cooperation with the adjacent first right inner side divided plate 36 when the first right inner side divided plate 36 and the adjacent first right inner side divided plate 36 are annually combined.

3-2. Second Right Inner Side Coil Assembly

Figure 4B:
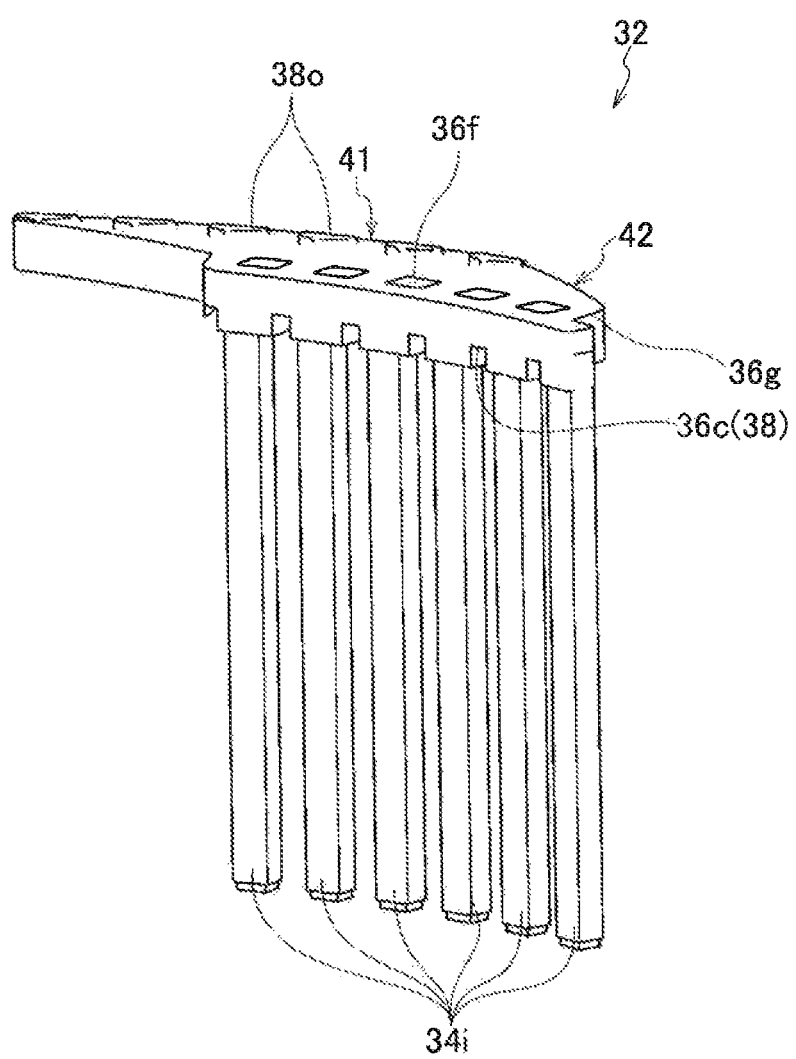
FIG. 4B is a perspective view of a second right inner side coil assembly including a second right inner side coil unit and a first radially inner side oil bar.

As shown in FIG. 4B, the second right inner side coil assembly 32 has a shape in which the outer side plate portion 36*b*, the first outer side connection coils 37, and the first radially outer side coil bars 34*o* are removed from the first right inner side coil assembly 31 (refer to FIG. 4A). Specifically, the second right inner side coil assembly 32 includes a second right inner side coil unit 41 having the same shape as the shape of the inner side plate portion 36*a*, and the first radially inner side coil bars 34*i*. The second right inner side coil unit 41 includes a second right inner side divided plate 42, and the first inner side connection coils 38 inserted into the coil grooves 36*e* formed on the inner surface side of the second right inner side divided plate 42 (the lower surface in the drawing). In other words, the second right inner side divided plate 42 is provided to extend on a plane on which the first inner side connection coils 38 are disposed. The radially inner end 38*i* of the first inner side connection coil 38 is connected to one end of the first radially inner side coil bar 34*i*.

Plural (five in the drawing) through holes 36*f* are formed on the radially outer side from the first radially inner side coil bar 34*i* (radially inner end 38*i*) in the second right inner side divided plate 42. The notched portion 36*g* formed at the right end of the second right inner side divided plate 42 forms another through hole (36*f*) in cooperation with the adjacent first right inner side divided plate 36.

In the second right inner side coil assembly 32, the radially outer ends 38*o* of the first inner side connection coils 38 are further exposed on the radially outer side outer surface side (the upper surface in the drawing) of the second right inner side divided plate 42.

3-3. Third Right Inner Side Coil Assembly

Figure 4C:
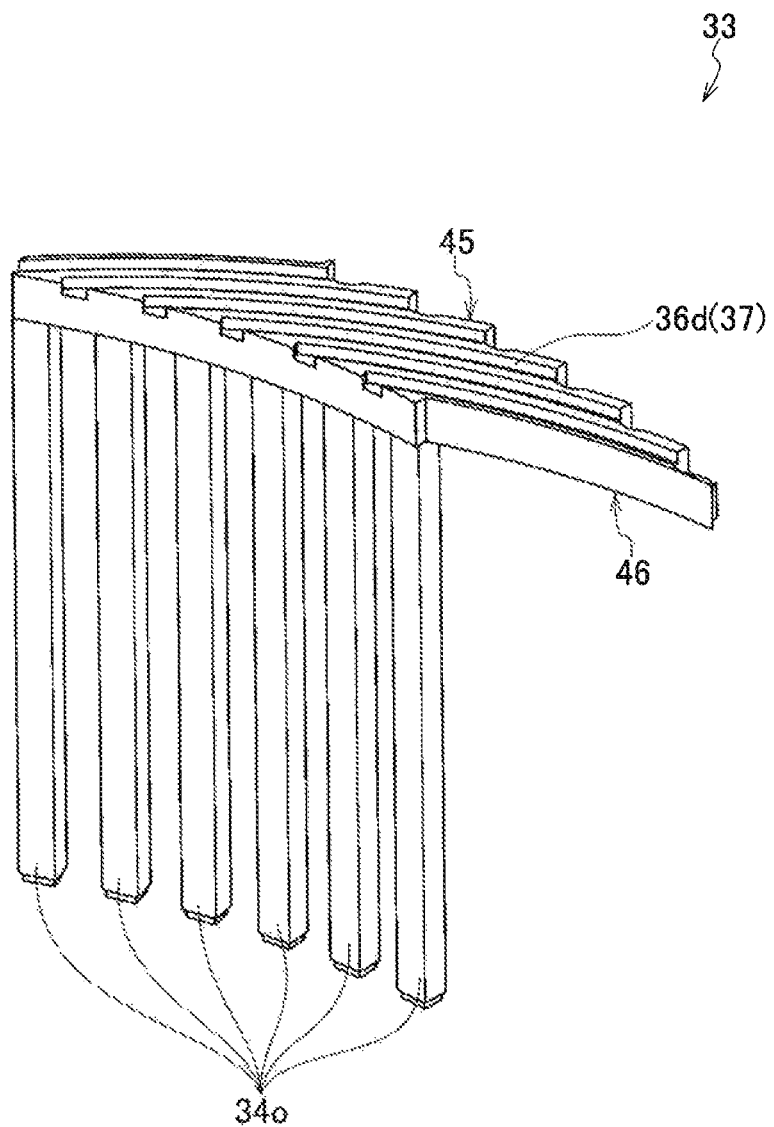
FIG. 4C is a perspective view of a third right inner side coil assembly including a third right inner side coil unit and a first radially outer side coil bar.

As shown in FIG. 4C, the third right inner side coil assembly 33 has a shape in which the inner side plate portion 36*a*, the first inner side connection coils 38, and the first radially inner side coil bars 34*i* are removed from the first right inner side coil assembly 31 (refer to FIG. 4A). Specifically, the third right inner side coil assembly 33 includes a third right inner side coil unit 45 having the same shape as the shape of the outer side plate portion 36*b*, and the first radially outer side coil bars 34*o*. The third right inner side coil unit 45 includes a third right inner side divided plate 46, and the first outer side connection coils 37 inserted into the coil grooves 36*d* formed on the outer surface side of the third right inner side divided plate 46 (the upper surface in the drawing). In other words, the third right inner side divided plate 46 is provided to extend on a plane on which the first outer side connection coils 37 are disposed. Respective one ends of each first radially outer side coil bar 34*o* are connected to the radially inner ends 37*i* of each first outer side connection coil 37.

In the third right inner side coil assembly 33, the radially outer ends 37*o* of the first outer side connection coils 37 (not shown in FIG. 4C) are further exposed on the radially outer side inner surface side (the lower surface in the drawing) of the third right inner side divided plate 46.

The second right inner side coil assembly 32 and the third right inner side coil assembly 33 are formed to have the same shape as the shape of the first right inner side coil assembly 31 when the third right inner side coil assembly 33 is disposed to be overlapped with the second right inner side coil assembly 32, and the radially outer ends 38*o* of the first inner side connection coils 38 exposed from the second right inner side coil assembly 32 are connected to the radially outer ends 37*o* of the first outer side connection coils 37 exposed from the third right inner side coil assembly 33.

4. Right Outer Side Base Plate Assembly

Figure 5:
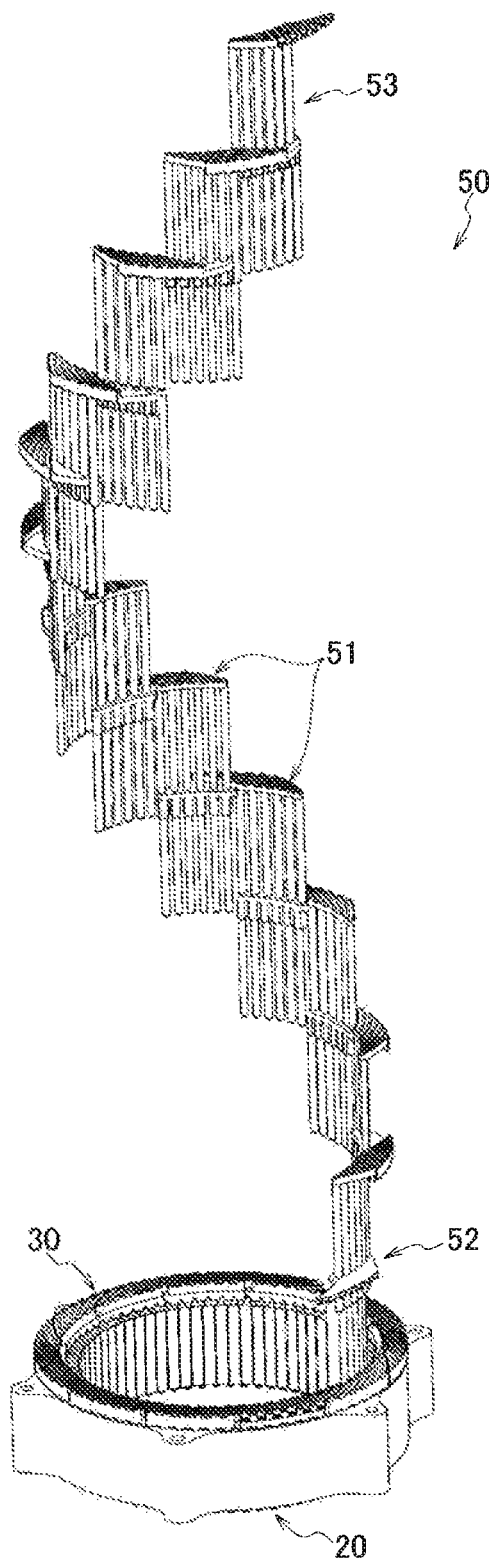
FIG. 5 is a perspective view illustrating a state in which a right outer side base plate assembly is assembled to the stator core to which the right inner side base plate assembly is assembled.

As shown in FIG. 5, the right outer side base plate assembly 50 includes 11 first right outer side coil assemblies 51, one second right outer side coil assembly 52, and one third right outer side coil assembly 53, and is disposed on the further axially right side of the right inner side base plate assembly 30 assembled to the stator core 20 in a laminated manner.

4-1. First Right Outer Side Coil Assembly

Figure 6A:
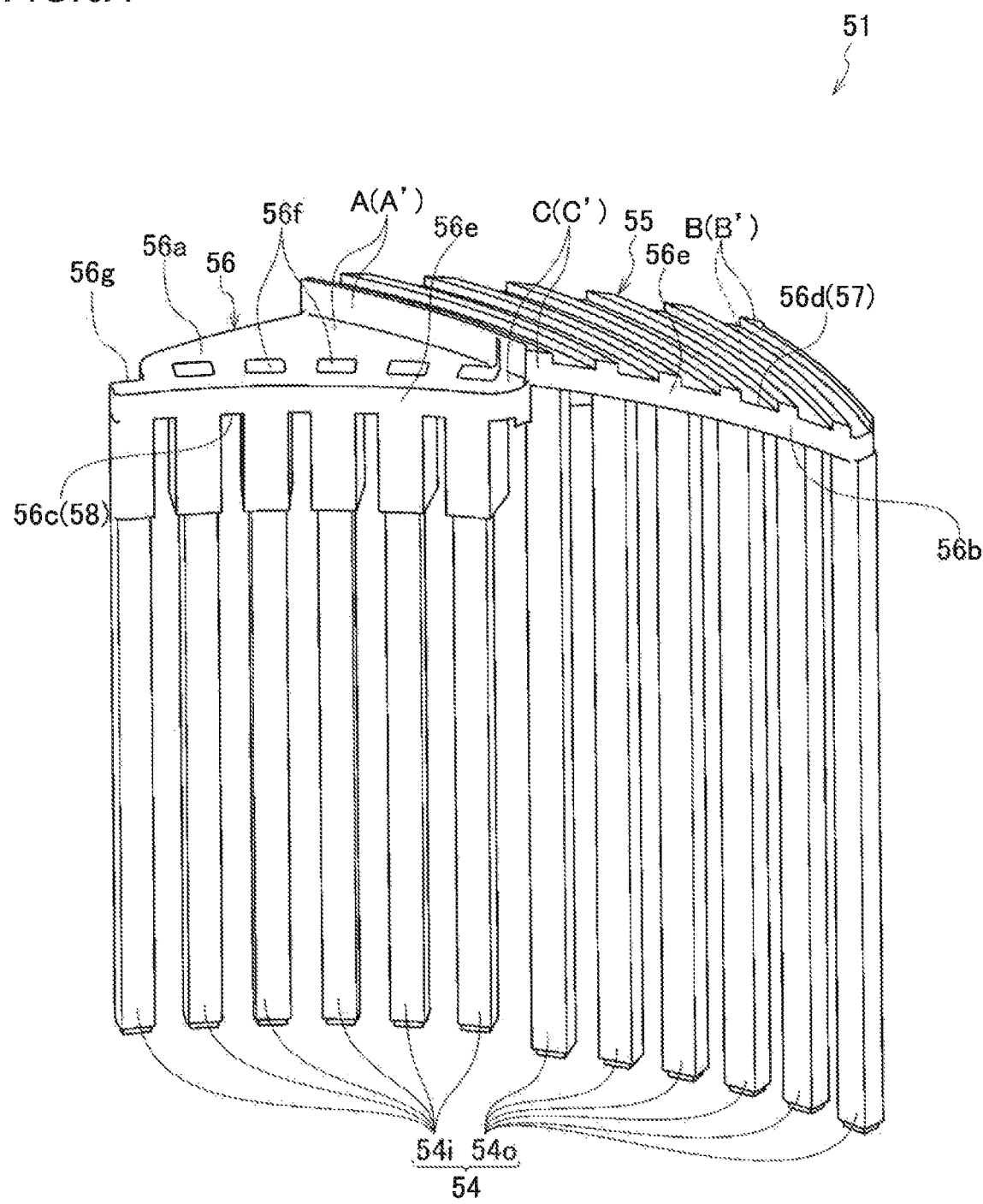
FIG. 6A is a perspective view of a first right outer side coil assembly including a first right outer side coil unit and a second coil bar.

As shown in FIG. 6A, the first right outer side coil assembly 51 is made up of second coil bars 54 and a first right outer side coil unit 55.

The second coil bar 54 is made up of plural (six in the embodiment shown in the drawing) second radially outer side coil bars 54*o* and plural (six in the embodiment shown in the drawing) second radially inner side coil bars 54*i*. The length of the second radially outer side coil bar 54*o* is set to a length of a line connecting the second outer side connection coil 57 disposed on the outer side of the right outer side base plate assembly 50 and the second outer side connection coil 57 disposed on the outer side of the left outer side base plate assembly 80, which passes through the stator core 20, referring to FIGS. 15 and 16. The length of the second radially inner side coil bar 54*i* is set to a length of a line connecting the second inner side connection coil 58 disposed on the inner side of the right outer side base plate assembly 50 and the second inner side connection coil 58 disposed on the inner side of the left outer side base plate assembly 80, which passes through the stator core 20. The second radially outer side coil bar 54*o* and the second radially inner side coil bar 54*i* are insulated from each other by covering the peripheries thereof by an insulating material which is injection molded such as a resin with both ends of each coil bar left uncovered.

The first right outer side coil unit 55 includes a first right outer side divided plate 56, plural (six in the embodiment shown in the drawing) second outer side connection coils 57, and plural (six in the embodiment shown in the drawing) second inner side connection coils 58.

The first right outer side divided plate 56 is made up of an inner side plate portion 56*a* which is formed in a substantial parallelogram plate shape falling in a clockwise direction, and an outer side plate portion 56*b* which is formed in a substantial parallelogram plate shape falling in a counterclockwise direction, and a part of the inner side plate portion 56*a* and a part of the outer side plate portion 56*b* are overlapped with each other and integrally formed. Specifically, in a state in which a substantially triangular region of the inner side plate portion 56*a* surrounded by A, B, and C, and a substantially triangular region of the outer side plate portion 56*b* surrounded by A', B', and C' shown in FIG. 6A are overlapped with each other, the inner side plate portion and the outer side plate portion are integrally formed.

Accordingly, in the region excluding the overlapped portion of the inner side plate portion 56*a* and the outer side plate portion 56*b*, a space for the thickness of the inner side plate portion 56*a* is formed on the inner surface side of the outer side plate portion 56*b* (the lower surface side in the drawing) and a space for the thickness of the outer side plate portion 56*b* is formed on the outer surface side of the inner side plate portion 56*a*.

Plural (six) coil grooves 56*c* having an approximately U-shaped cross section, which are opened to the inner surface, are formed on the inner surface side of the inner side plate portion 56*a* (the lower surface in the drawing) along involute curves extending in clockwise directions when viewed through the assembly from the axially outer side so as to lie close to one another. Plural (six) coil grooves 56*d* having an approximately U-shaped cross section, which are opened to the outer surface, are formed on the outer surface side of the outer side plate portion 56*b* (the upper surface in the drawing) along involute curves extending in directions opposite to the directions of the coil grooves 56*c* (counterclockwise directions) when viewed from the axially outer side so as to lie close to one another. That is, the coil grooves 56*c* and the coil grooves 56*d* are formed so as to cross one another on planes which are disposed in different axial positions.

Figure 12:
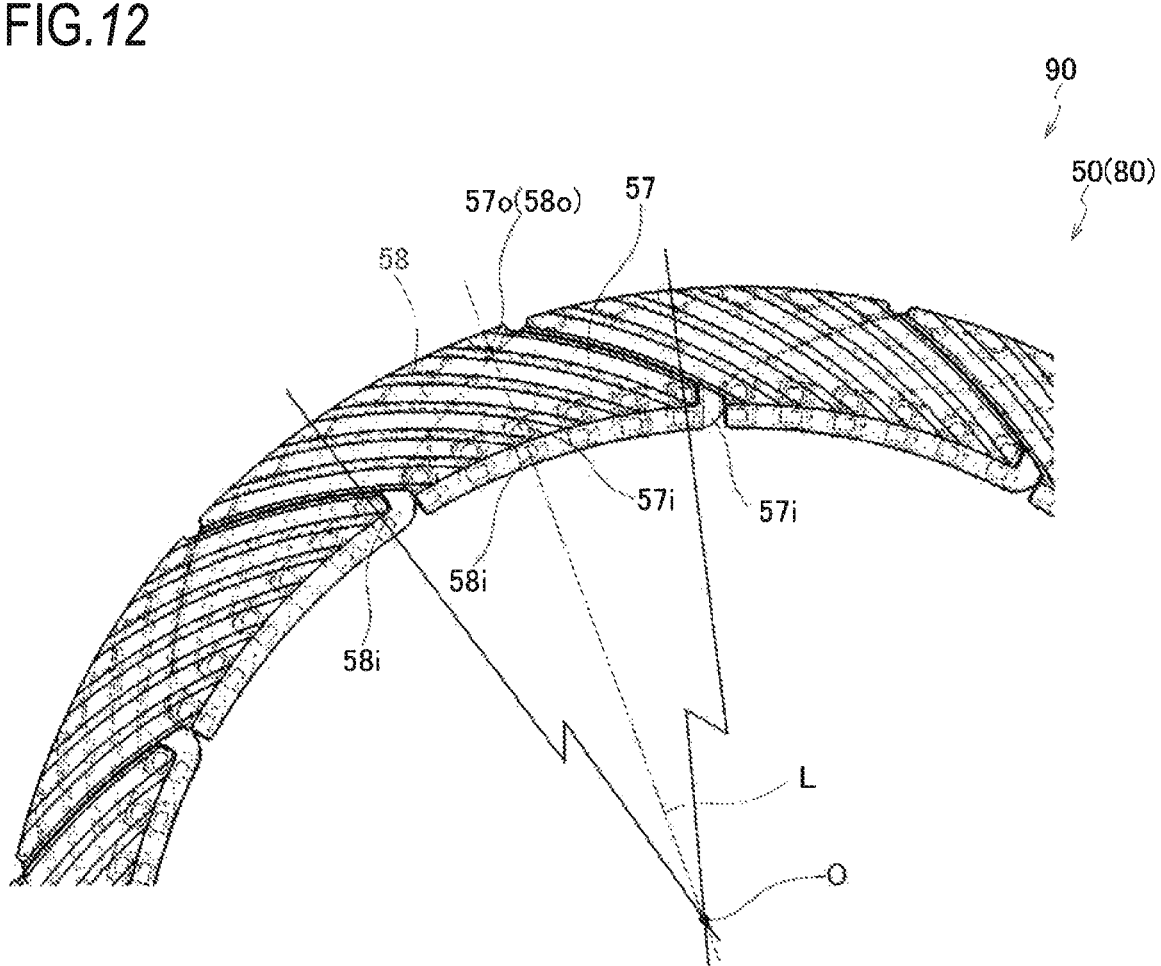
FIG. 12 is a partial side view of the right outer side base plate assembly and the left outer side base plate assembly when viewed from an axially outer side thereof.

The second inner side connection coils 58 are inserted into the coil grooves 56*c* and the second outer side connection coils 57 are inserted into the coil grooves 56*d*. In other words, the inner side plate portion 56*a* is provided to extend on a plane on which the second inner side connection coils 58 are disposed and the outer side plate portion 56*b* is provided to extend on a plane on which the second outer side connection coils 57 are disposed. Referring to FIG. 12, when the right outer side base plate assembly 50 is annularly assembled to the axially right side of the right inner side base plate assembly 30, radially outer ends 57*o* of the second outer side connection coils 57 and radially outer ends 58*o* of the second inner side connection coils 58 are disposed on the same circumference around a center O of the right outer side base plate assembly 50 (stator core 20).

Each second inner side connection coil 58 is provided to extend to the radially outer end 58*o* located on an extension of a straight line L connecting a radially inner end 58*i*, another third radially inner end 58*i* from the radially inner end 58*i* in the clockwise direction, and the center O of the right outer side base plate assembly 50. The second outer side connection coil 57 is provided to extend to the radially outer end 57*o* located on an extension of a straight line L connecting a radially inner end 57*i*, another third radially inner end 57*i* from the radially inner end 57*i* in the counterclockwise direction, and the center O of the right outer side base plate assembly 50. That is, the radially inner ends 58*i* of the six second inner side connection coils 58 and the radially inner ends 57*i* of the six second outer side connection coils 57, which are separated from one another in the circumferential direction, are electrically connected in the inside of the first right outer side divided plate 56 respectively through the third radially outer end 58*o* and the third radially outer end 57*o* in the counterclockwise direction and in the clockwise direction.

The radial length of the second inner side connection coil 58 is set to be longer than the radial length of the second outer side connection coil 57, and the radially inner end 58*i* of the second inner side connection coil 58 is provided to extend to the radially inner side from the radially inner end 57*i* of the second outer side connection coil 57. Accordingly, the inner side plate portion 36*a* is also provided to extend to the radially inner side from the outer side plate portion 36*b*. Referring to FIGS. 15 and 16, respective one ends of each second radially inner side coil bar 54*i* are connected to the radially inner ends 58*i* of each second inner side connection coil 58. Respective one ends of each second radially outer side coil bar 54*o* are connected to the radially inner ends 57*i* of each second outer side connection coil 57.

Except that the predetermined radially outer end 58*o* of the second inner side connection coil 58 and the predetermined radially outer end 57*o* of the second outer side connection coil 57 are electrically connected to each other, the second outer side connection coil 57 and the second inner side connection coil 58, the second outer side connection coils 57, and the second inner side connection coils 58 are separated by partition walls 56*e* of the first right outer side divided plate 56, whereby the connection coils are insulated. Further, plural (five in the drawing) through holes 56*f* are formed in the inner side plate portion 56*a* on the radially outer side of the second radially inner side coil bar 54*i* (radially inner end 58*i*).

The through holes 56*f* are holes for inserting the second radially outer side coil bars 54*o* of the adjacent first right outer side coil assembly 51, and are insulated from the second inner side connection coil 58 by the partition walls 56*e*. In other words, the second inner side connection coil 58 is formed so as to be bent to avoid the second radially outer side coil bar 54*o* (the radially inner end 57*i* of the second outer side connection coil 57) (refer to FIG. 12). A notched portion 56*g* formed in the end portion of the inner side plate portion 56*a* forms another through hole (56*f*) in cooperation with the adjacent first right outer side divided plate 56 when the first right outer side divided plate 56 and the adjacent first right outer side divided plate 56 are annually combined.

4-2. Second Right Outer Side Coil Assembly

Figure 6B:
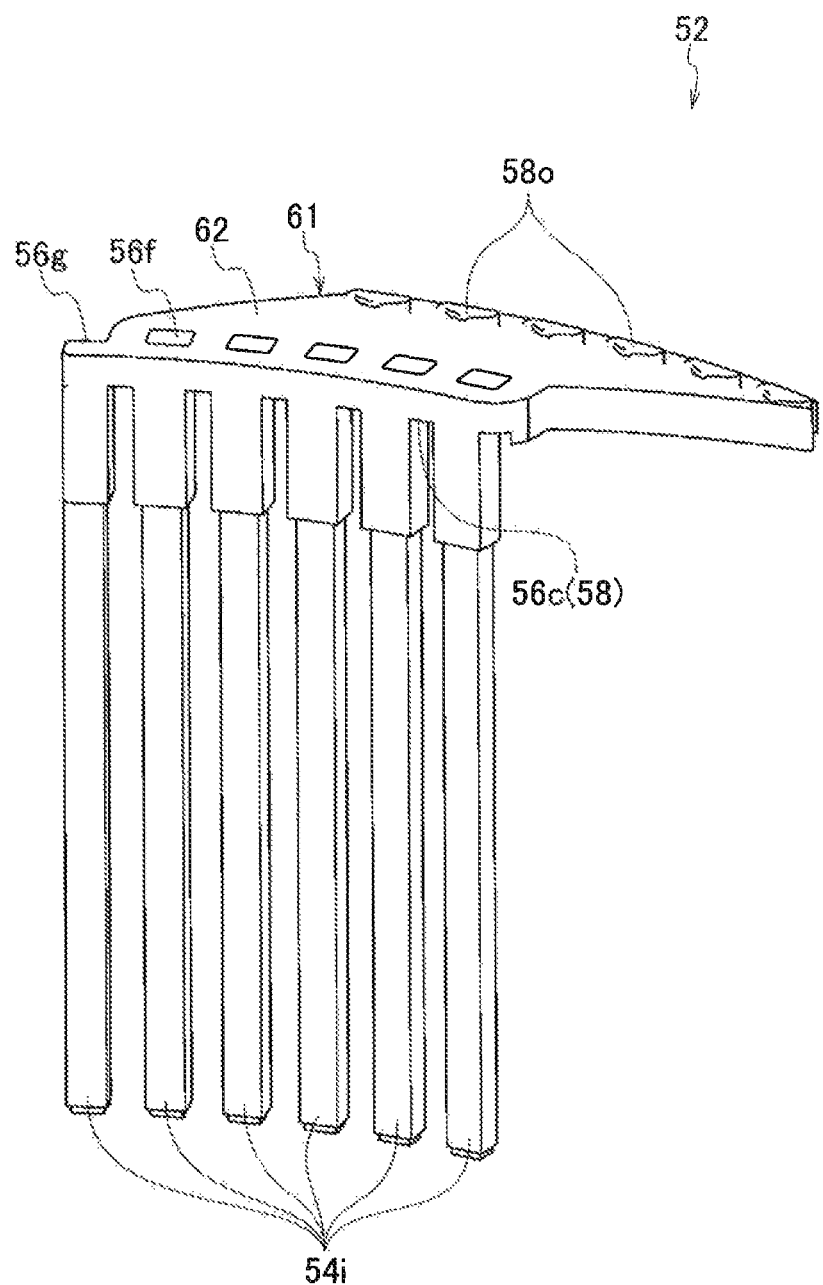
FIG. 6C is a perspective view of a third right outer side coil assembly including a third right outer side coil unit and a second radially outer side coil bar.

As shown in FIG. 6B, the second right outer side coil assembly 52 has a shape in which the outer side plate portion 56*b*, the second outer side connection coils 57, and the second radially outer side coil bars 54*o* are removed from the first right outer side coil assembly 51 (refer to FIG. 6A). Specifically, the second right outer side coil assembly 52 includes a second right outer side coil unit 61 having the same shape as the shape of the inner side plate portion 56a, and the second radially inner side coil bars 54i. The second right outer side coil unit 61 includes a second right outer side divided plate 62, and the second inner side connection coils 58 inserted into the coil grooves 56c formed on the inner surface side of the second right outer side divided plate 62 (the lower surface in the drawing). In other words, the second right outer side divided plate 62 is provided to extend on a plane on which the second inner side connection coils 58 are disposed. The radially inner end 58i of the second inner side connection coil 58 is connected to one end of the second radially inner side coil bar 54i.

Plural (five in the drawing) through holes 56f are formed in second right outer side divided plate 62 on the radially outer side from the radially inner end 58i of the second radially inner side coil bar 54i. The notched portion 56g formed in the end portion of the second right outer side divided plate 62 forms another through hole (56f) in cooperation with the adjacent first right outer side divided plate 56.

In the second right outer side coil assembly 52, the radially outer ends 58o of the second inner side connection coils 58 are further exposed on the radially outer side outer surface side of the second right outer side divided plate 62 (the upper surface in the drawing).

4-3. Third Right Outer Side Coil Assembly

Figure 6C:
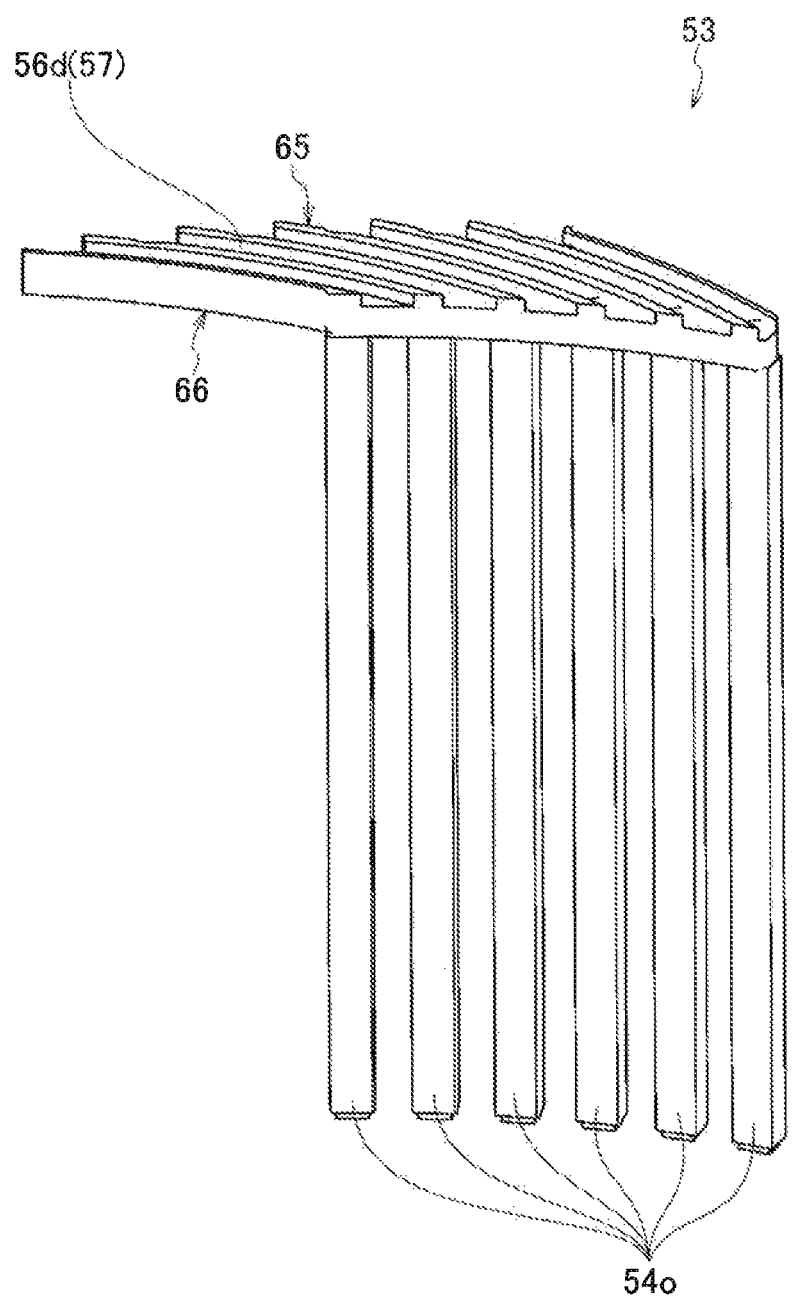

As shown in FIG. 6C, the third right outer side coil assembly 53 has a shape in which the inner side plate portion 56a, the second inner side connection coils 58, and the second radially inner side coil bars 54i are removed from the first right outer side coil assembly 51 (refer to FIG. 6A). Specifically, the third right outer side coil assembly 53 includes the third right outer side coil unit 65 having the same shape as the shape of the outer side plate portion 56b and the second radially outer side coil bars 54o. The third right outer side coil unit 65 includes a third right outer side divided plate 66 and the second outer side connection coils 57 inserted into the coil grooves 56d formed on the outer surface side of the third right outer side divided plate 66 (the upper surface in the drawing). In other words, the third right outer side divided plate 66 is provided to extend on a plane on which the second outer side connection coils 57 are disposed. Respective one ends of each second radially outer side coil bar 54o are connected to the radially inner ends 57i of each second outer side connection coil 57.

In the third right outer side coil assembly 53, the radially outer ends 57o of the second outer side connection coils 57 (not shown in FIG. 6C) are further exposed on the radially outer side inner surface side (the lower surface in the drawing) of the third right outer side divided plate 66.

The second right outer side coil assembly 52 and the third right outer side coil assembly 53 have the same shape as the shape of the first right outer side coil assembly 51 when the third right outer side coil assembly 53 is disposed to be overlapped with the second right outer side coil assembly 52, and the radially outer ends 58o of the second inner side connection coils 58 exposed from the second right outer side coil assembly 52 are connected to the radially outer ends 57o of the second outer side connection coils 57 exposed from the third right outer side coil assembly 53.

5. Left Inner Side Base Plate Assembly

Figure 7:
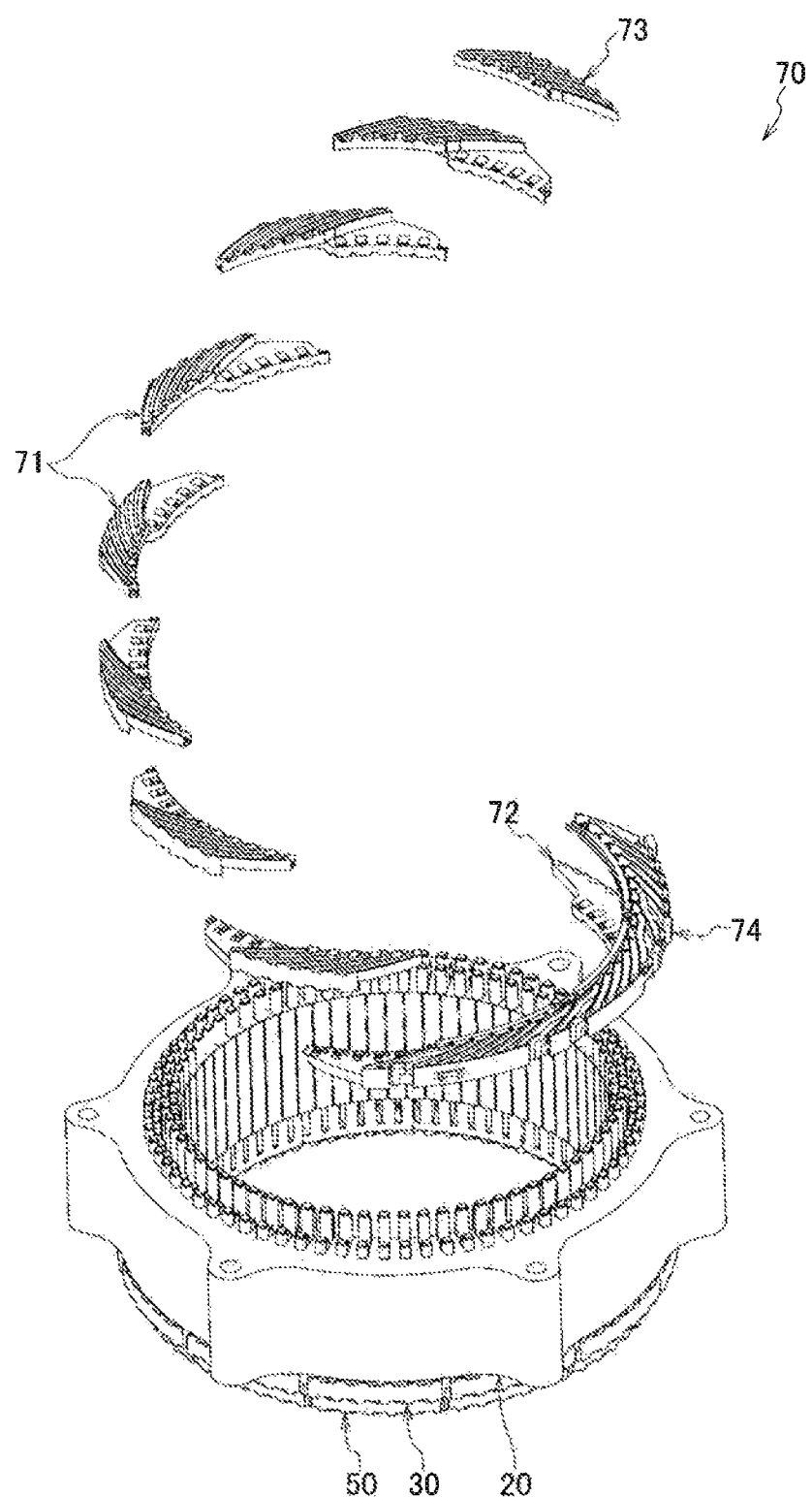
FIG. 7 is a perspective view illustrating a state in which a left inner side base plate assembly is assembled to the stator core.

As shown in FIG. 7, the left inner side base plate assembly 70 includes seven first left inner side coil units 71, one second left inner side coil unit 72, one third left inner side coil unit 73, and one fourth left inner side coil unit 74 and is disposed to be annually assembled to the axially left side of the stator core 20.

5-1. First Left Inner Side Coil Unit

Figure 8A:
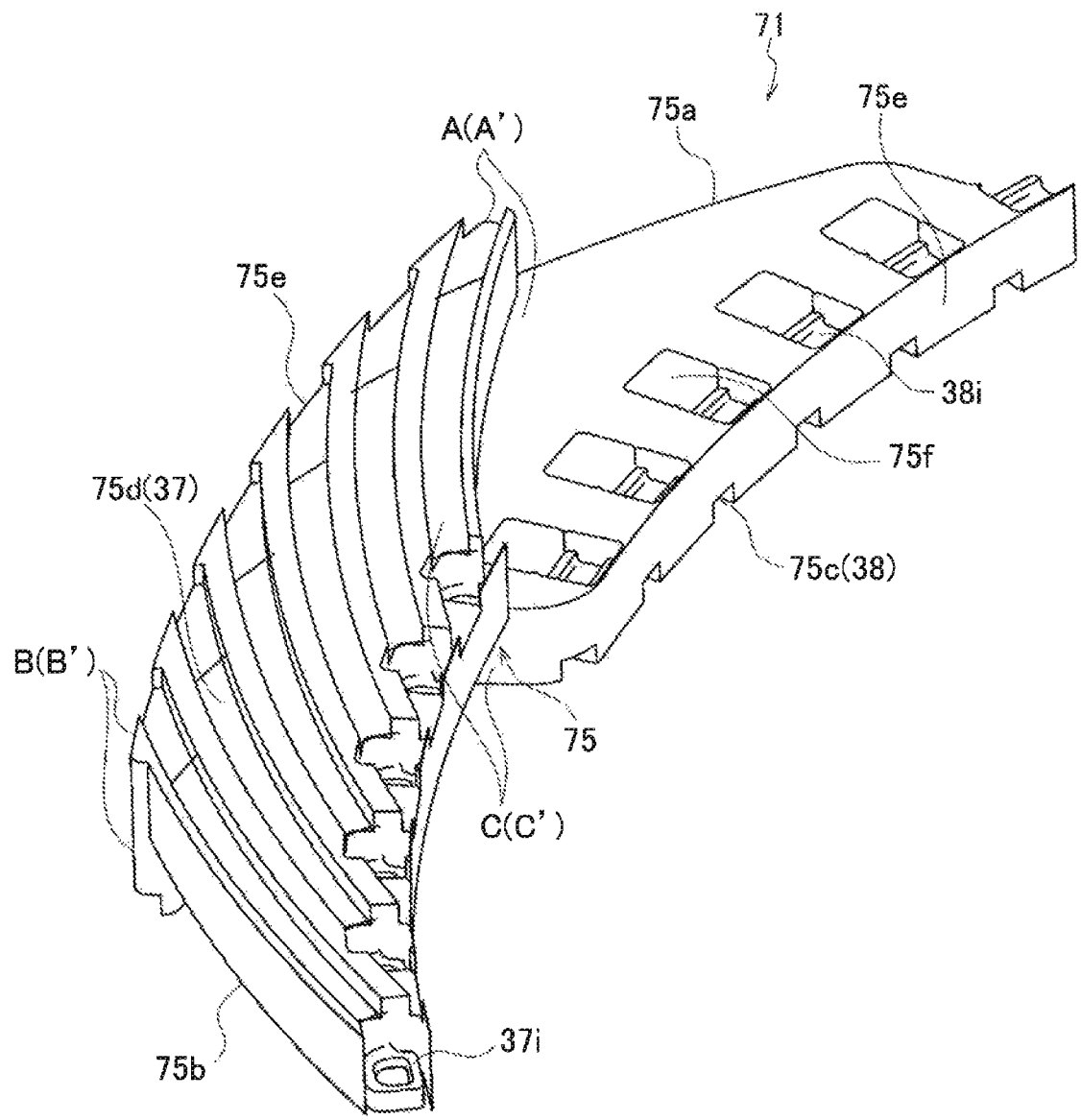
FIG. 8A is a perspective view of a first left inner side coil unit.

As shown in FIG. 8A, the first left inner side coil unit 71 includes a first left inner side divided plate 75, the plural (six in the embodiment shown in the drawing) first outer side connection coils 37, and the plural (six in the embodiment shown in the drawing) first inner side connection coils 38.

The first left inner side divided plate 75 has almost the same shape as the shape of the first right inner side divided plate 36 shown in FIG. 4A, and is made up of an inner side plate portion 75a which is formed in a substantial parallelogram plate shape falling in a counterclockwise direction, and an outer side plate portion 75b which is formed in a substantial parallelogram plate shape falling in a clockwise direction, and a part of the inner side plate portion 75a and a part of the outer side plate portion 75b are overlapped with each other and integrally formed. Specifically, in a state in which a substantially triangular region of the inner side plate portion 75a surrounded by A, B, and C, and a substantially triangular region of the outer side plate portion 75h surrounded by A', B', and C' shown in FIG. 8A are overlapped with each other, the inner side plate portion and the outer side plate portion are integrally formed.

Accordingly, in the region excluding the overlapped portion of the inner side plate portion 75a and the outer side plate portion 75b, a space for the thickness of the inner side plate portion 75a is formed on the inner surface side of the outer side plate portion 75b (the lower surface side in the drawing) and a space for the thickness of the outer side plate portion 75b is formed on the outer surface side of the inner side plate portion 75a.

Plural (six) coil grooves 75c having an approximately U-shaped cross section, which are opened to the inner surface, are formed on the inner surface side of the inner side plate portion 75a (the lower surface in the drawing) along involute curves extending in counterclockwise directions when viewed through the assembly from the axially outer side. Plural (six) coil grooves 75d having an approximately U-shaped cross section, which are opened to the outer surface, are formed on the outer surface side of the outer side plate portion 75b (the upper surface in the drawing) along involute curves extending in directions opposite to the directions of the coil grooves 75c (clockwise directions) when viewed from the axially outer side. That is, the coil grooves 75c and the coil grooves 75d are formed so as to cross one another on planes which are disposed in different axial positions.

The first inner side connection coils 38 are inserted into the coil grooves 75c and the first outer side connection coils 37 are inserted into the coil grooves 75d. In other words, the inner side plate portion 75a is provided to extend on a plane on which the first inner side connection coils 38 are disposed and the outer side plate portion 75b is provided to extend on a plane on which the first outer side connection coils 37 are disposed. In the radially inner side of the inner side plate portion 75a, insertion holes 75f into which the first radially outer side coil bars 34o are inserted are formed. On the radially inner side of the insertion hole 75f, the radially inner end 38i of the first inner side connection coil 38 is exposed. On the radially inner side of the outer side plate portion 75b, the radially inner end 37i of the first outer side connection coil 37 is exposed at the same radial position as the radial position of the insertion hole 75f of the inner side plate portion 75a.

Since the positional relation and the connection relation between the first outer side connection coil 37 and the first inner side connection coil 38 disposed on the First left inner side divided plate 75 are the same as the positional relation and the connection relation between the first outer side connection coil 37 and the first inner side connection coil 38 disposed on the first right inner side divided plate 36 illustrated in FIG. 11, the detailed description thereof will be omitted. The first outer side connection coil 37 and the first inner side connection coil 38, the first outer side connection coils 37, and the first inner side connection coils 38 are insulated by partition walls 75e of the first left inner side divided plate 75.

5-2. Second Left Inner Side Coil Unit

Figure 8B:
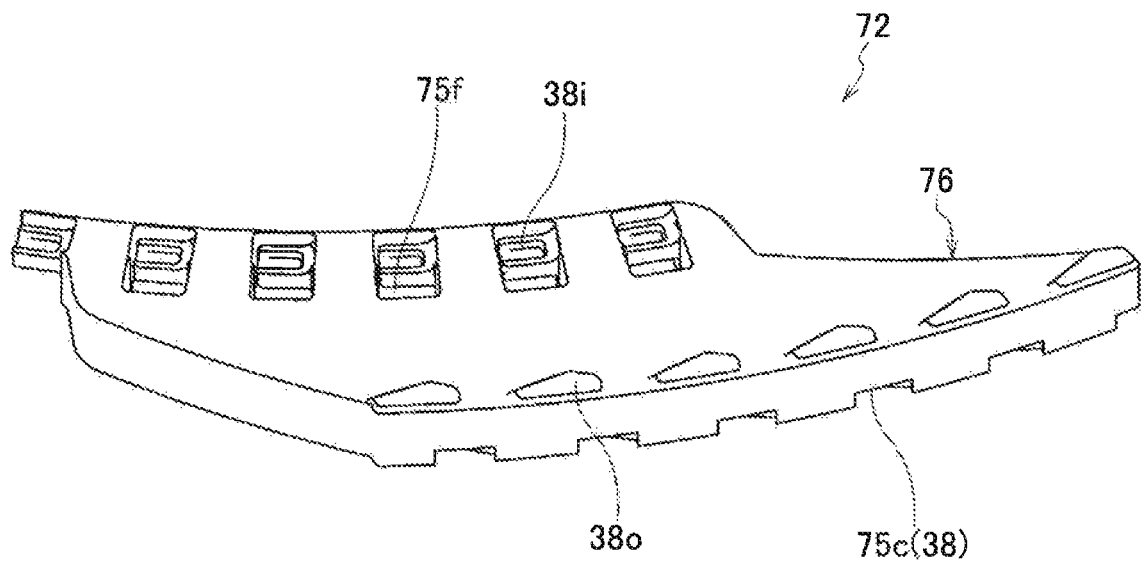
FIG. 8B is a perspective view of a second left inner side coil unit.

As shown in FIG. 8B, the second left inner side coil unit 72 has a shape in which the outer side plate portion 75b and the first outer side connection coils 37 are removed from the first left inner side divided plate 75 (refer to FIG. 8A). Specifically, the second left inner side coil unit 72 includes a second left inner side divided plate 76 having the same shape as the shape of the inner side plate portion 75a, and the plural (six) first inner side connection coils 38 inserted into the six coil grooves 75e formed on the inner surface side of the second left inner side divided plate 76 (the lower surface in the drawing). In other words, the second left inner side divided plate 76 is provided to extend on a plane on which the first inner side connection coils 38 are disposed.

On the radially outer side outer side surface of the second left inner side coil unit 72 (the upper surface in the drawing), the radially outer ends 38o of the respective first inner side connection coils 38 are exposed. On the radially inner side of the second left inner side divided plate 76, the insertion holes 75f into which the first radially outer side coil bars 34o are inserted are formed and on the further radially inner side thereof, the radially inner ends 38i of the first inner side connection coils 38 are exposed.

5-3. Third Left Inner Side Coil Unit

Figure 8C:
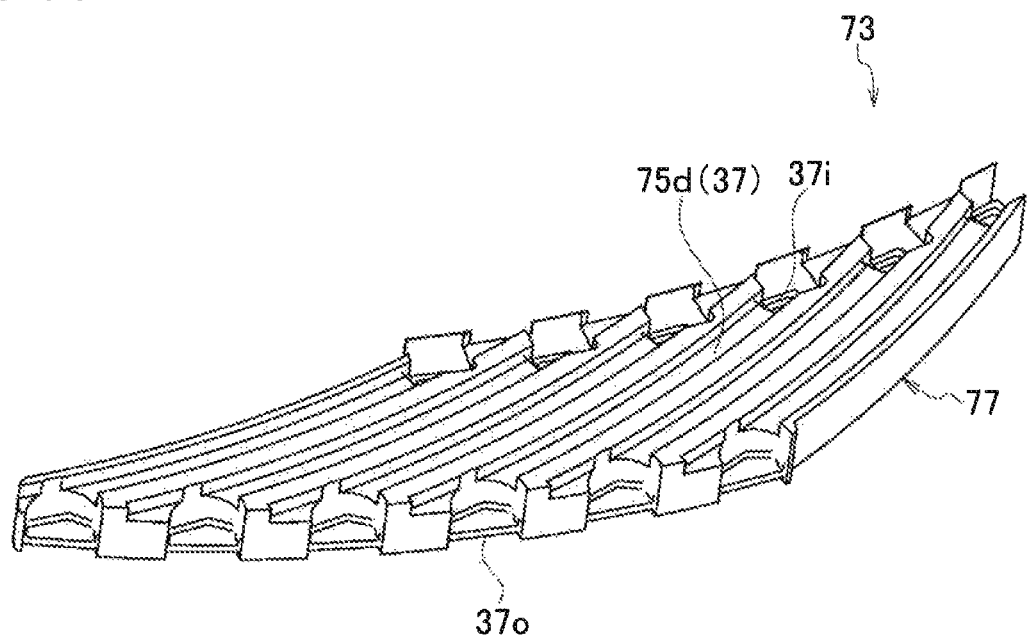
FIG. 8C is a perspective view of a third left inner side coil unit.

As shown in FIG. 8C, the third left inner side coil unit 73 has a shape in which the inner side plate portion 75a and the first inner side connection coils 38 are removed from the first left inner side divided plate 75 (refer to FIG. 8A). Specifically, the third left inner side coil unit 73 includes a third left inner side divided plate 77 having the same shape as the shape of the outer side plate portion 75b, and the plural (six) first outer side connection coils 37 inserted into the six coil grooves 75d formed on the outer surface side of the third left inner side divided plate 77 (the upper surface in the drawing). In other words, the third left inner side divided plate 77 is provided to extend on a plane on which the first outer side connection coils 37 are disposed.

On the radially outer side inner side surface of the third left inner side coil unit 73 (the lower surface in the drawing), the radially outer ends 37o of the respective first outer side connection coils 37 are exposed. On the radially inner side of the third left inner side divided plate 77, the radially inner ends 37i of the first outer side connection coils 37 are exposed.

The second left inner side coil unit 72 and the third left inner side coil unit 73 have the same shape as the shape of the first left inner side coil unit 71 when the third left inner side coil unit 73 is disposed to be overlapped with the second left inner side coil unit 72, and the radially outer ends 38o of the first inner side connection coils 38 exposed from the second left inner side coil unit 72 are connected to the radially outer ends 37o of the first outer side connection coils 37 exposed from the third left inner side coil unit 73.

5-1. Fourth Left Inner Side Coil Unit

Figure 8D:
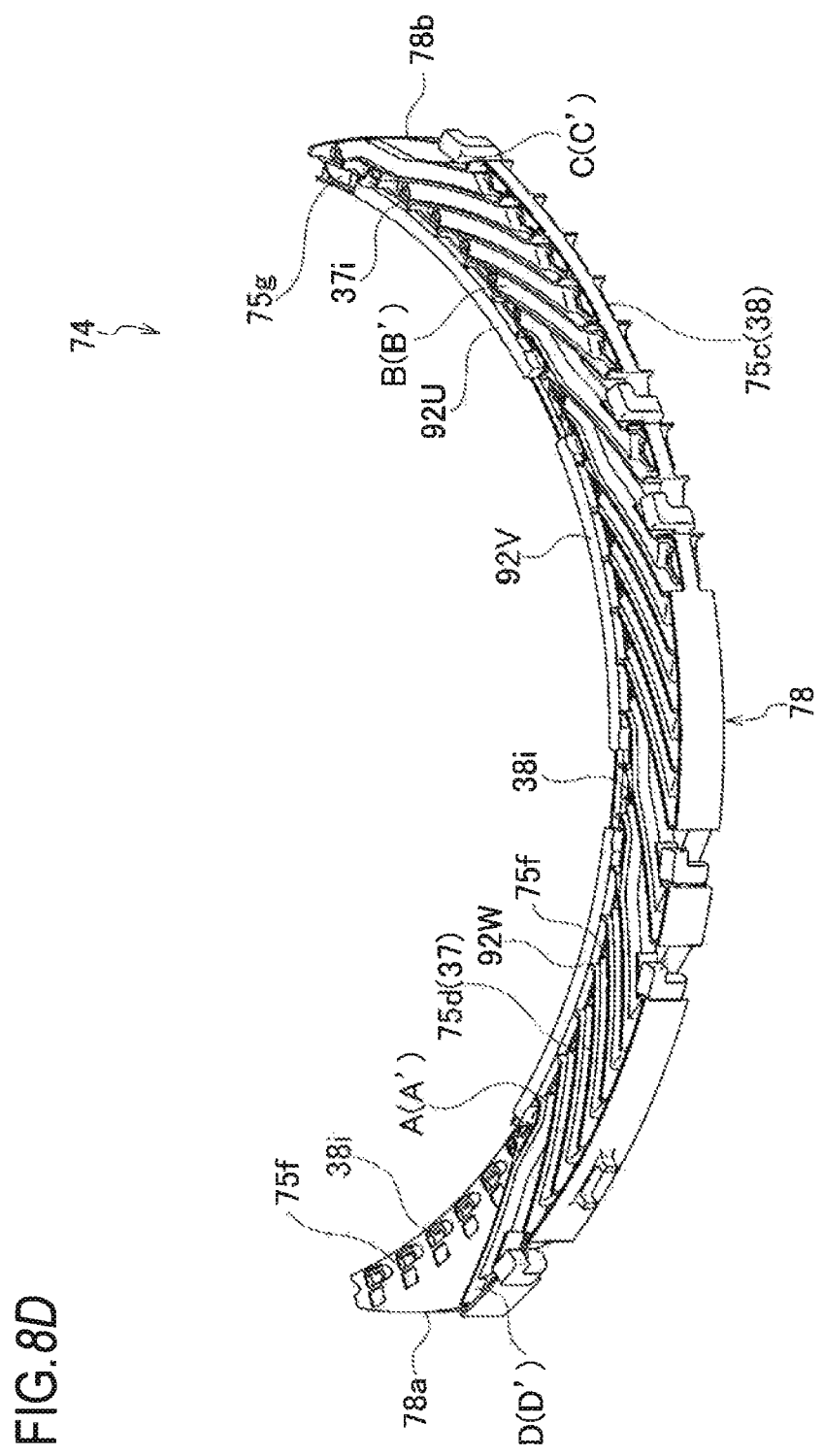
FIG. 8D is a perspective view of a fourth left inner side coil unit.

As shown in FIG. 8D, the fourth left inner side coil unit 74 includes a fourth left inner side divided plate 78, the plural first outer side connection coils 37, and the plural first inner side connection coil 38. The fourth left inner side divided plate 78 has a shape in which substantially four first left inner side divided plates 75 are continuously disposed in the circumferential direction and is made up of an inner side plate portion 78a which is formed in a substantial parallelogram plate shape falling in a counterclockwise direction, and an outer side plate portion 78b which is formed in a substantial parallelogram plate shape falling in a clockwise direction, and a part of the inner side plate portion 78a and a part of the outer side plate portion 78b are overlapped with each other and integrally formed. Specifically, in a state in which a substantially trapezoidal region of the inner side plate portion 78a surrounded by A, B, and C and a substantially trapezoidal region of the outer side plate portion 78b surrounded by A', B', and C' shown in FIG. 8D are overlapped with each other, the inner side plate portion and the outer side plate portion are integrally formed. Hereinafter, a region in which the inner side plate portion 78a and the outer side plate portion 78b are overlapped with each other is referred to as an overlapped portion.

Accordingly, in the region excluding the overlapped portion of the inner side plate portion 78a and the outer side plate portion 78b, a space for the thickness of the inner side plate portion 78a is formed on the inner surface side of the outer side plate portion 78b (the lower surface side in the drawing) and a space for the thickness of the outer side plate portion 78b is formed on the outer surface side of the inner side plate portion 78a.

The plural coil grooves 75c having an approximately U-shaped cross section, which are opened to the inner surface, are formed on the inner surface side of the inner side plate portion 78a (the lower surface in the drawing) along involute curves extending in counterclockwise directions when viewed through the assembly from the axially outer side. The plural coil grooves 75d having an approximately U-shaped cross section, which are opened to the outer surface, are formed on the outer surface side of the outer side plate portion 78b (the upper surface in the drawing) along involute curves extending in directions opposite to the directions of the coil grooves 75c (clockwise directions) when viewed from the axially outer side. That is, the coil grooves 75c and the coil grooves 75d are formed so as to cross one another on planes which are disposed in different axial positions.

The first inner side connection coils 38 are inserted into the coil grooves 75c and the first outer side connection coils 37 are inserted into the coil grooves 75d. On the radially inner side of the inner side plate portion 78a, the insertion holes 75f into which the first radially outer side coil bars 34o are inserted are formed. On the further radially inner side of the insertion hole 75f, the radially inner end 38i of the first inner side connection coil 38 is exposed. On the radially inner side of the outer side plate portion 78b, the radially inner end 37i of the first outer side connection coil 37 is exposed at the same radial position as the radial position of the insertion hole 75f of the inner side plate portion 78a. In the overlapped portion, the radially inner ends 37i of the first outer side connection coils 37 are exposed with predetermined intervals so as to continue in the circumferential direction from the insertion holes 75f formed in the inner side plate portion 78a, and on the radially inner sides of the radially inner ends 37i, the radially inner ends 38i of the first inner side connection coils 38 are exposed with predetermined intervals so as to continue in the circumferential direction from the radially inner ends 38i of the first inner side connection coils 38 provided in the inner side plate portion 78a. Further, in the example shown in the drawing, busbars 92U, 92V, and 92W which connect coils of the same phase are disposed in the fourth left inner side coil unit 74.

6. Left Outer Side Base Plate Assembly

Figure 9:
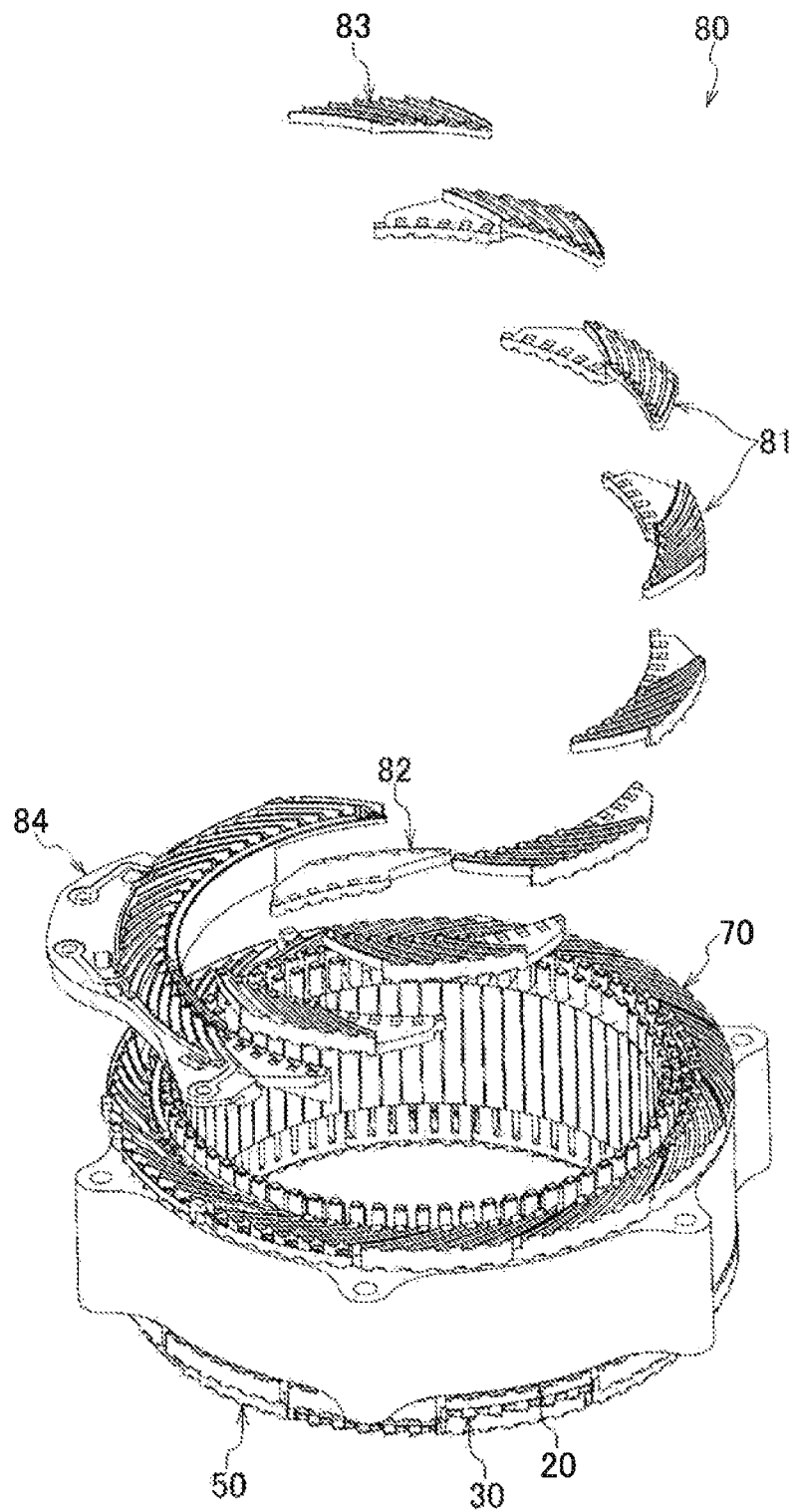
FIG. 9 is a perspective view illustrating a state in which a left outer side base plate assembly is assembled to the stator core to which the left inner side base plate assembly is assembled.

As shown in FIG. 9, the left outer side base plate assembly 80 includes seven first left outer side coil units 81, one second left outer side coil unit 82, one third left outer side coil unit 83, and one fourth left outer side coil unit 84, and is disposed to be annually assembled to the axially left side of the left inner side base plate assembly 70.

6-1. First Left Outer Side Coil Unit

Figure 10A:
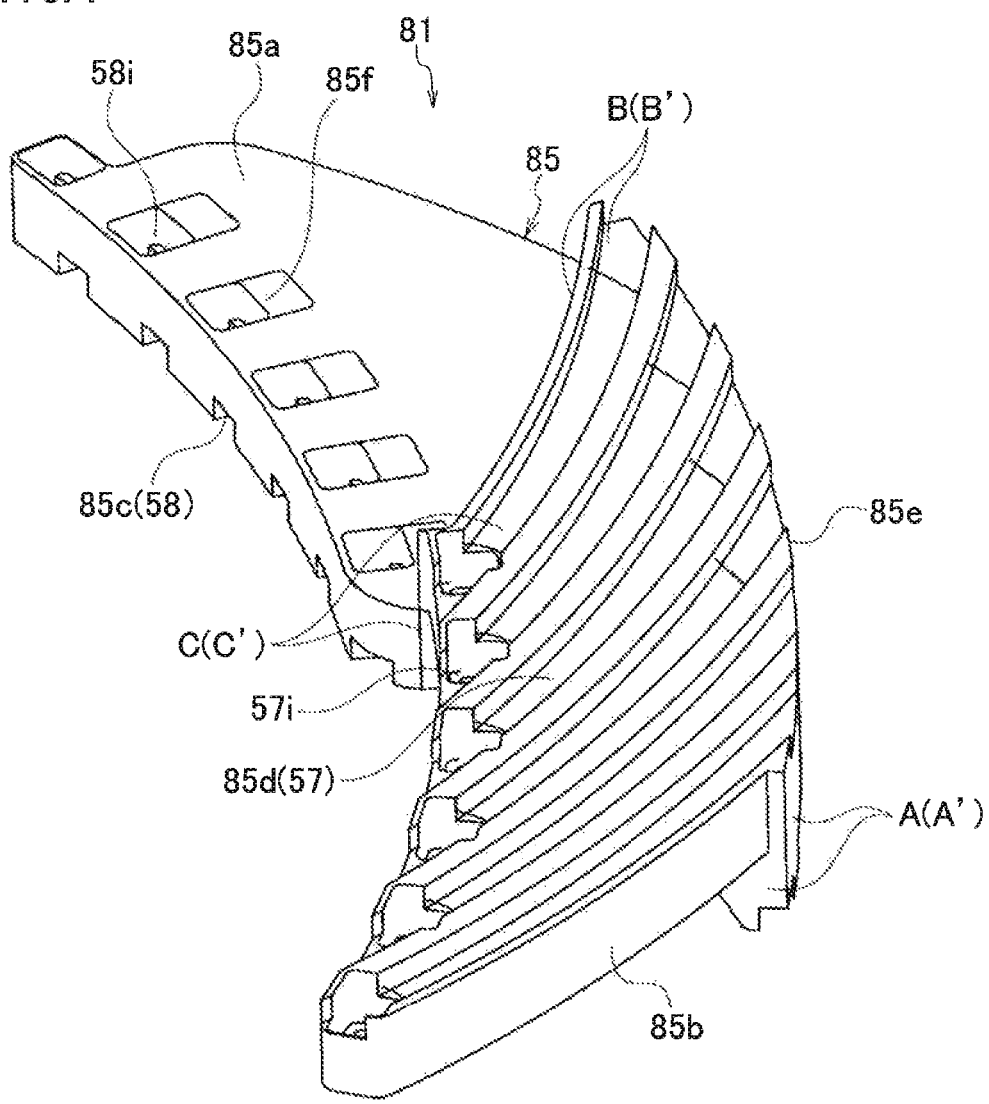
FIG. 10A is a perspective view of a first left outer side coil unit.

As shown in FIG. 10A, the first left outer side coil unit 81 includes a first left outer side divided plate 85, the plural (six in the embodiment shown in the drawing) second outer side connection coils 57, and the plural (six in the embodiment shown in the drawing) second inner side connection coils 58.

The first left outer side divided plate 85 has substantially the same shape as the shape of the first right outer side divided plate 56 shown in FIG. 6A, and is made up of an inner side plate portion 85a which is formed in a substantial parallelogram plate shape falling in a clockwise direction, and an outer side plate portion 85b which is formed in a substantial parallelogram plate shape falling in a counter-clockwise direction in the drawing, and a part of the inner side plate portion 85a and a part of the outer side plate portion 85b are overlapped with each other and integrally formed. Specifically, in a state in which a substantially triangular region of the inner side plate portion 85a surrounded by A, B, and C, and a substantially triangular region of the outer side plate portion 85b surrounded by A', B', and C' shown in FIG. 10A are overlapped with each other, the inner side plate portion and the outer side plate portion are integrally formed.

Accordingly, in the region excluding the overlapped portion of the inner side plate portion 85a and the outer side plate portion 85b, a space for the thickness of the inner side plate portion 85a is formed on the inner surface side of the outer side plate portion 85b (the lower surface side in the drawing) and a space for the thickness of the outer side plate portion 85b is formed on the outer surface side of the inner side plate portion 85a (the upper surface side in the drawing).

Plural (six) coil grooves 85c having an approximately U-shaped cross section, which are opened to the inner surface, are formed on the inner surface side of the inner side plate portion 85a (the lower surface in the drawing) along involute curves extending in clockwise directions when viewed through the assembly from the axially outer side. Plural (six) coil grooves 85d having an approximately U-shaped cross section, which are opened to the outer surface, are formed on the outer surface side of the outer side plate portion 85b (the upper surface in the drawing) along involute curves extending in directions opposite to the directions of the coil grooves 85c (counterclockwise directions) when viewed from the axially outer side. That is, the coil grooves 85c and the coil grooves 85d are formed so as to cross one another on planes which are disposed in different axial positions.

The second inner side connection coils 58 are inserted into the coil grooves 85c and the second outer side connection coils 57 are inserted into the coil grooves 85d. In other words, the inner side plate portion 85a is provided to extend on a plane on which the second inner side connection coils 58 are disposed and the outer side plate portion 85b is provided to extend on a plane on which the second outer side connection coils 57 are disposed. On the radially inner side of the inner side plate portion 85a, insertion holes 85f into which the second radially outer side coil bars 54o are inserted are formed. On the radially inner side of the insertion hole 85f, the radially inner end 58i of the second inner side connection coil 58 is exposed. On the radially inner side of the outer side plate portion 85b, the radially inner end 57i of the second outer side connection coil 57 is exposed at the same radial position as the radial position of the insertion hole 85f of the inner side plate portion 85a. Where the left outer side base plate assembly 80 is assembled to the stator core 20 to which the right inner side base plate assembly 30 and the right outer side base plate assembly 50 are assembled, the second radially inner side coil bars 54i are connected to the radially inner ends 58i of the second inner side connection coils 58 and the second radially outer side coil bars 54o are connected to the radially inner ends 57i of the second outer side connection coils 57.

Since the positional relation and the connection relation between the second outer side connection coil 57 and the second inner side connection coil 58 disposed in the first left outer side divided plate 85 are the same as the positional relation and the connection relation between the second outer side connection coil 57 and the second inner side connection coil 58 disposed on the first right outer side divided plate 56 illustrated in FIG. 12, the detailed description thereof will be omitted. The second outer side connection coil 57 and the second inner side connection coil 58, the second outer side connection coils 57, and the second inner side connection coils 58 are insulated by partition walls 85e of the first left outer side divided plate 85.

6-2. Second Left Outer Side Coil Unit

Figure 10B:
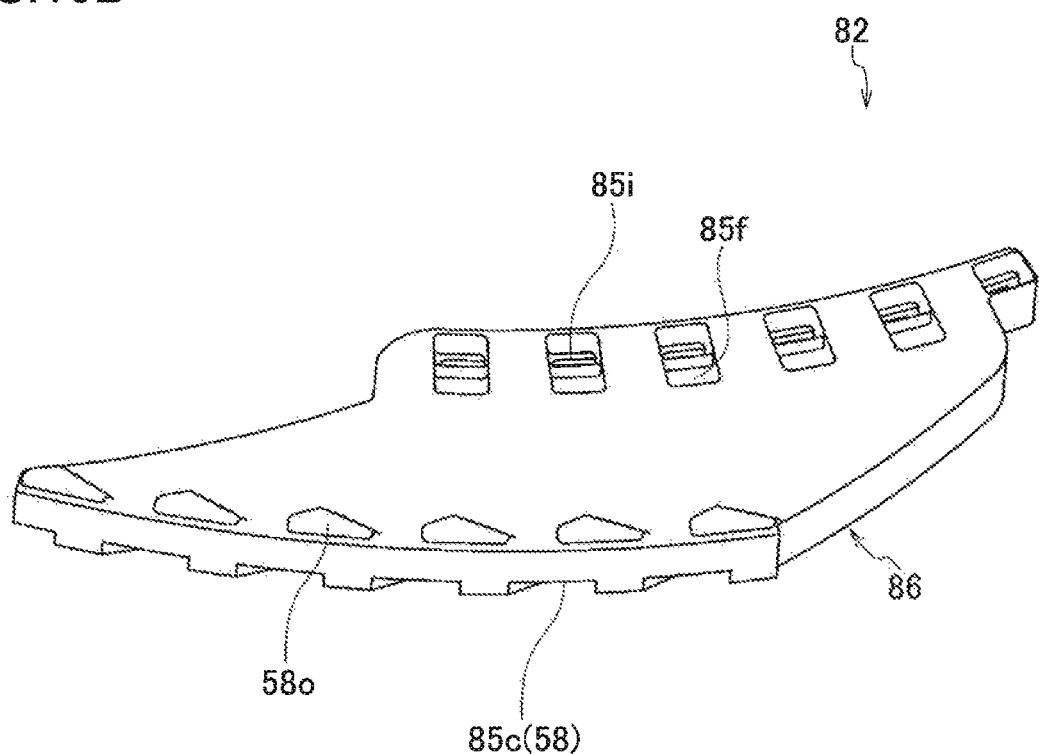
FIG. 10B is a perspective view of a second left outer side coil unit.

As shown in FIG. 10B, the second left outer side coil unit 82 has a shape in which the outer side plate portion 85b and the second outer side connection coils 57 are removed from the first left outer side divided plate 85 (refer to FIG. 10A). Specifically, the second left outer side coil unit 82 includes a second left outer side divided plate 86 having the same shape as the shape of the inner side plate portion 85a, and the plural (six) second inner side connection coils 58 inserted into the six coil grooves 85c formed on the inner surface side of the second left outer side divided plate 86 (the lower surface in the drawing). In other words, the second left outer side divided plate 86 is provided to extend on a plane in which the second inner side connection coils 58 are arranged.

On the radially outer side outer side surface of the second left outer side coil unit 82 (the upper surface in the drawing), the radially outer ends 58o of the respective second inner side connection coils 58 are formed to be exposed. On the radially inner side of the second left outer side coil unit 82, the insertion holes 85f into which the second radially outer side coil bars 54o are inserted are formed and on the further radially inner side thereof, the radially inner ends 58i of the second inner side connection coils 58 are exposed.

6-3. Third Left Outer Side Coil Unit

Figure 10C:
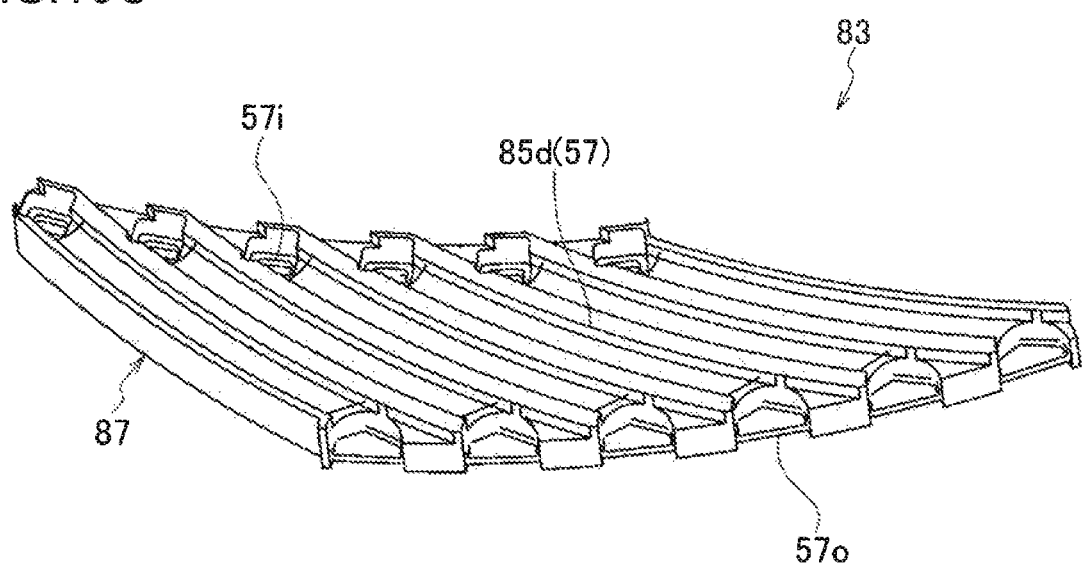
FIG. 10C is a perspective view of a third left outer side coil unit.

As shown in FIG. 10C, the third left outer side coil unit 83 has a shape is which the inner side plate portion 85a and the second inner side connection coils 58 are removed from the first left outer side divided plate 85 (refer to FIG. 10A). Specifically, the third left outer side coil unit 83 includes a third left outer side divided plate 87 having the same shape as the shape of the outer side plate portion 85b, and the plural (six) second outer side connection coils 57 inserted into the six coil grooves 85d formed on the outer surface side of the third left outer side divided plate 87 (the upper surface in the drawing). In other words, the third left outer side divided plate 87 is provided to extend on a plane on which the second outer side connection coils 57 are disposed.

On the radially outer side inner side surface of the third left outer side coil unit 83 (the lower surface in the drawing), the radially outer ends 57*o* of the respective second outer side connection coils 57 are exposed. On the radially inner side of the third left outer side coil unit 83, the radially inner ends 57*i* of the second outer side connection coils 57 are exposed.

The second left outer side coil unit 82 and the third left outer side coil unit 83 have the same shape as the shape of the first left outer side coil unit 81 when the third left outer side coil unit 83 is disposed to be overlapped with the second left outer side coil unit 82, and the radially outer ends 58*o* of the second inner side connection coils 58 exposed from the second left outer side coil unit 82 are connected to the radially outer ends 57*o* of the second outer side connection coils 57 exposed from the third left outer side coil unit 83.

6-4. Fourth Left Outer Side Coil Unit

As shown in FIG. 10D, the fourth left outer side coil unit 84 includes a fourth left outer side divided plate 88, the plural second outer side connection coils 57, and the plural second inner side connection coils 58 (not shown in FIG. 10D). The fourth left outer side divided plate 88 has the same shape in which substantially four first left outer side divided plates 85 are disposed to continue in the circumferential direction and is made up of an inner side plate portion 88*a* which is formed in a substantial parallelogram plate shape falling in a clockwise direction, and an outer side plate portion 88*b* which is formed in a substantial parallelogram plate shape falling in a counterclockwise direction, and a part of the inner side plate portion 88*a* and a part of the outer side plate portion 88*b* are overlapped with each other and integrally formed. Specifically, in a state in which a substantially trapezoidal region of the inner side plate portion 88*a* surrounded by A, B, and C, and a substantially trapezoidal region of the outer side plate portion 88*b* surrounded by A', B', and C' are overlapped with each other, the inner side plate portion and the outer side plate portion are integrally formed. Hereinafter, a region in which the inner side plate portion 88*a* and the outer side plate portion 88*b* are overlapped with each other is referred to as an overlapped portion.

Accordingly, in the region excluding the overlapped portion of the inner side plate portion 88*a* and the outer side plate portion 88*b*, a space for the thickness of the inner side plate portion 88*a* is formed on the inner surface side of the outer side plate portion 88*b* (the lower surface side in the drawing) and a space for the thickness of the outer side plate portion 88*b* is formed on the outer surface side of the inner side plate portion 88*a*.

The plural coil grooves 85*c* (not shown in FIG. 10D) having an approximately U-shaped cross section, which are opened to the inner surface, are formed on the inner surface side of the inner side plate portion 88*a* (the lower surface in the drawing) along involute curves extending in clockwise directions when viewed through the assembly from the axially outer side. The plural coil grooves 85*d* having an approximately U-shaped cross section, which are opened to the outer surface, are formed on the outer surface side of the outer side plate portion 88*b* (the upper surface in the drawing) along involute curves extending in directions opposite to the directions of the coil grooves 85*c* (counterclockwise directions) when viewed from the axially outer side. That is, the coil grooves 85*c* and the coil grooves 85*d* are formed so as to cross one another on planes which are disposed in different axial positions.

The second inner side connection coils 58 are inserted into the coil grooves 85*c* and the second outer side connection coils 57 are inserted into the coil grooves 85*d*. On the radially inner side of the inner side plate portion 88*a*, the insertion holes 85*f* into which the second radially outer side coil bars 54*o* are inserted are formed. On the further radially inner side of the insertion hole 85*f*, the radially inner end 58*i* of the second inner side connection coil 58 is exposed. On the radially inner side of the outer side plate portion 88*b*, the radially inner end 57*i* of the second outer side connection coil 57 is exposed at the same radial position as the radial position of the insertion hole 85*f* of the inner side plate portion 88*a*. In the overlapped portion, the radially inner ends 57*i* of the second outer side connection coils 57 are exposed with predetermined intervals so as to continue in the circumferential direction from the insertion holes 85*f* formed in the inner side plate portion 88*a*, and on the radially inner sides of the radially inner ends 57*i*, the radially inner ends 58*i* of the second inner side connection coils 58 are exposed with predetermined intervals so as to continue in the circumferential direction from the radially inner ends 58*i* of the second inner side connection coils 58 provided in the inner side plate portion 88*a*. Further, in the example shown in the drawing, a middle point busbar 89M which connects coils of U, V, and W phases and terminal portions 89U, 89V, and 89W of U, V, and W phases are provided in the fourth left outer side coil unit 84.

7. Assembling 7-1. Assembling of Right Inner Side Base Plate Assembly

Next, assembling of the stator 10 will be described in detail. As shown in FIG. 3, first, the right inner side base plate assembly 30 is assembled to the axially right side of the stator core 20. The right inner side base plate assembly 30 is assembled in the clockwise direction in the order of the second right inner side coil assembly 32, the first right inner side coil assembly 31, and the third right inner side coil assembly 33.

Specifically, the six first radially inner side coil bars 34*i* of the second right inner side coil assembly 32 are inserted into the slots 21 of the stator core 20 (at the second position from the radially outer side of each slot 21), and the second right inner side divided plate 42 is brought into abutment with the right side surface of the stator core 20. Next, the first right inner side coil assembly 31 is disposed to be adjacent to the second right inner side coil assembly 32 in the clockwise direction. The six first radially outer side coil bars 34*o* are inserted into the through holes 36*f* of the second right inner side coil assembly 32 and are inserted into slots 21 of the stator core 20 (at the outermost radial position of each slot 21), and the six first radially inner side coil bars 34*i* are inserted into the slots 21 of the stator core 20 so that the outer side plate portion 36*b* of the first right inner side coil assembly 31 is disposed to be overlapped with the second right inner side coil assembly 32.

Thereafter, similarly, the remaining ten first right inner side coil assemblies 31 are sequentially assembled such that the first radially outer side coil bars 34*o* are inserted into the through holes 36*f* of the adjacent first right inner side coil assembly 31 in the counterclockwise direction and the first radially inner side coil bars 34*i* are inserted into the slots 21 of the stator core 20.

Finally, the first radially outer side coil bars 34*o* of the third right inner side coil assembly 33 are inserted into the through holes 36*f* of the first right inner side coil assembly 31 that is last assembled, and the third right inner side coil assembly is overlapped with the second right inner side coil assembly 32. The radially outer ends 38*o* of the first inner side connection coils 38 of the second right inner side coil assembly 32 are connected to the radially outer ends 37o of the first outer side connection coils 37 of the third right inner side coil assembly 33. The radially outer ends 38o of the first inner side connection coils 38 and the radially outer ends 37o of the first outer side connection coils 37 of the third right inner side coil assembly 33 are preferably connected by joining the radially outer ends by welding, caulking, or the like. The same is applied to the connection of the connection coils and the connection of the coil bar and the connection coil which will be described later.

Accordingly, the right inner side base plate assembly 30 is annually disposed on the axially right side of the stator core 20.

7-1 Assembling of Right Outer Side Base Plate Assembly

Next, as shown in FIG. 5, the right outer side base plate assembly 50 is assembled to the axially right side of the right inner side base plate assembly 30. The right outer side base plate assembly 50 is assembled in the counterclockwise direction in the order of the second right outer side coil assembly 52, the first right outer side coil assembly 51, and the third right outer side coil assembly 53.

Specifically, first, the six second radially inner side coil bars 54i of the second right outer side coil assembly 52 are inserted into the slots 21 of the stator core 20 (at the innermost radial position of each slot 21) and the second right outer side divided plate 62 is brought into abutment with the right side surface of the right inner side base plate assembly 30. Next, the first right outer side coil assembly 51 is disposed to be adjacent to the second right outer side coil assembly 52 in the counterclockwise direction. The six second radially outer side coil bars 54o are inserted into the through holes 56f of the second right outer side coil assembly 52 and are inserted into the slots 21 of the stator core 20 (at the second position from the innermost side of each slot 21), and the six second radially inner side coil bars 54i are inserted into the slots 21 of the stator core 20 (at the innermost radial position of each slot 21). The outer side plate portion 56b of the first right outer side coil assembly 51 is disposed to be overlapped with the second right outer side coil assembly 52.

Thereafter, similarly, the remaining ten first right outer side coil assemblies 51 are sequentially assembled such that the second radially outer side coil bars 54o are inserted into the through holes 56f of the adjacent first right outer side coil assembly 51 in the clockwise direction and the second radially inner side coil bars 54i are inserted into the slots 21 of the stator core 20.

Finally, the second radially outer side coil bars 54o of the third right outer side coil assembly 53 are inserted into the through holes 56f of the first right outer side coil assembly 51 assembled last and the third right outer side coil assembly is overlapped with the second right outer side coil assembly 52. The radially outer ends 58o of the second inner side connection coils 58 of the second right outer side coil assembly 52 are connected to the radially outer ends 57o of the second outer side connection coils 57 of the third right outer side coil assembly 53.

Accordingly, the right outer side base plate assembly 50 is annually disposed on the axially right side of the right inner side base plate assembly 30.

Figure 13:
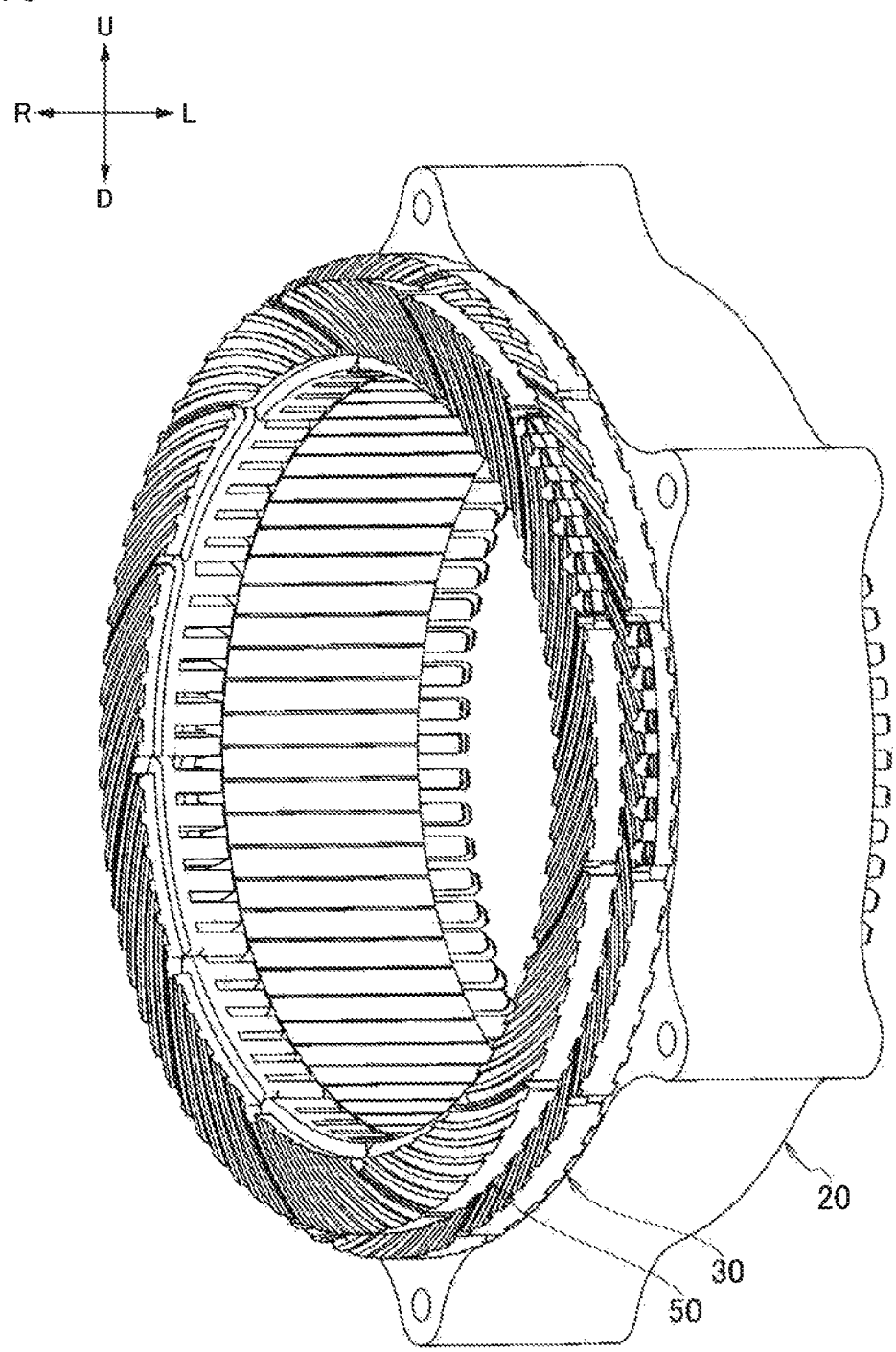
FIG. 13 is a right side perspective view of the stator core to which the right inner side base plate assembly and the right outer side base plate assembly are assembled.
Figure 14:
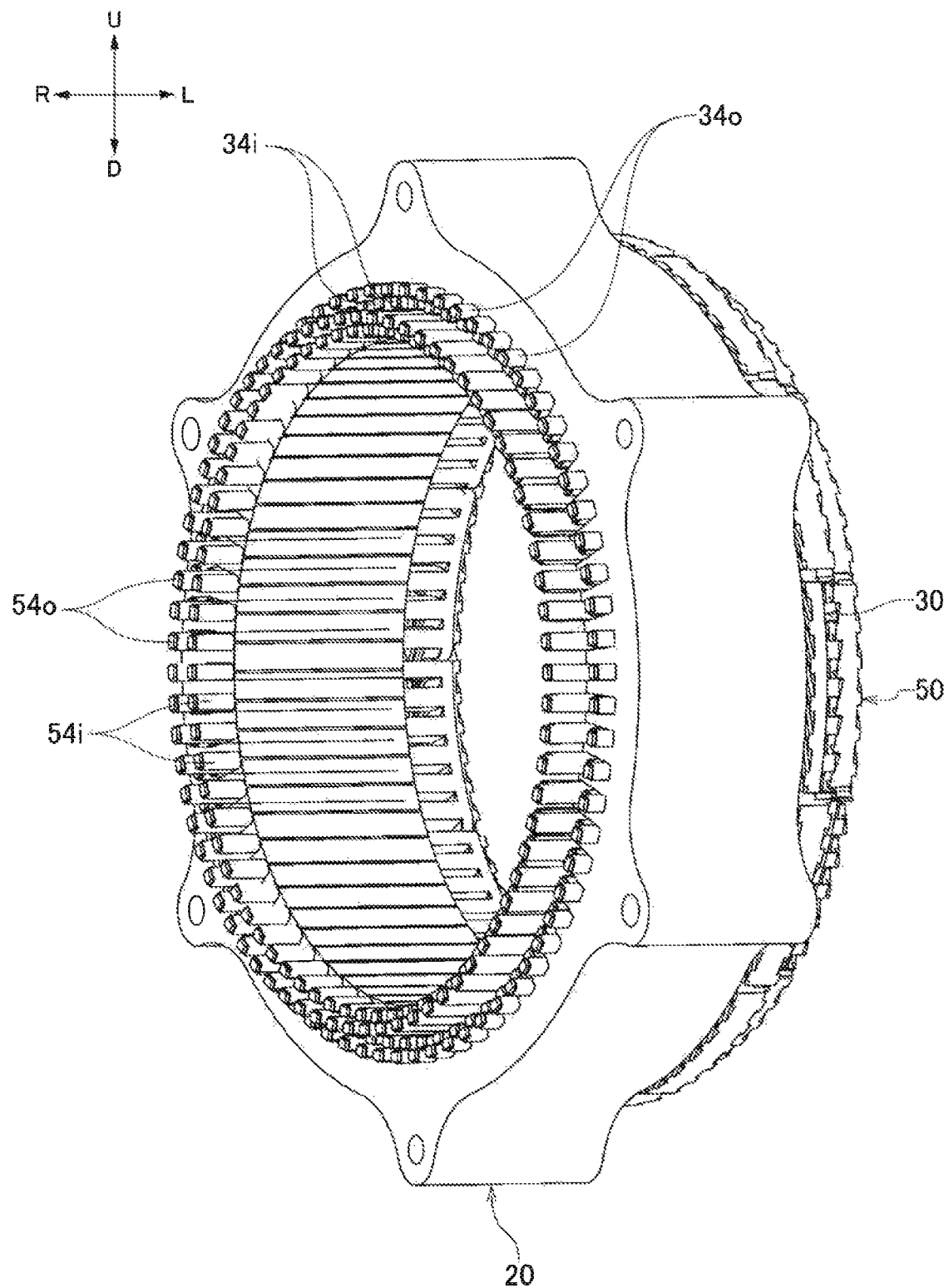
FIG. 14 is a left side perspective view of the stator core in FIG. 13.

FIGS. 13 and 14 are respectively a right side perspective view and a left side perspective view of the stator core 20 to which the right inner side base plate assembly 30 and the right outer side base plate assembly 50 are assembled, and from the left side surface of the stator core 20, the 72 first radially outer side coil bars 34o, the 72 first radially inner side coil bars 34i, the 72 second radially outer side coil bars 54o, and the 72 second radially inner side coil bars 54i project from the radially outer side in this order.

7-3. Assembling of Left Inner Side Base Plate Assembly

Next, as shown in FIG. 7, the left inner side base plate assembly 70 is assembled to the axially left side of the stator core 20. The left inner side base plate assembly 70 is assembled in the clockwise direction in the order of the second left inner side coil unit 72, the fourth left inner side coil unit 74, the first left inner side coil unit 71, and the third left inner side coil unit 73.

Specifically; first, the other ends of the six first radially outer side coil bars 34o projecting from the left side surface of the stator core 20 are allowed to pass through the insertion holes 75f of the second left inner side coil unit 72 to project and the other ends of the six first radially inner side coil bars 34i are connected to the radially inner ends 38i of the first inner side connection coils 38 exposed in the second left inner side coil unit 72.

The fourth left inner side coil unit 74 is disposed to be adjacent to the second left inner side coil unit 72 in the clockwise direction. The other ends of the plural first radially outer side coil bars 34o brought into abutment with the radially inner ends 37i of the first outer side connection coils 37 of the fourth left inner side coil unit 74 are respectively connected to the radially inner ends 37i of the first outer side connection coils 37 and the first radially inner side coil bars 34i projecting from the left side surface of the stator core 20 are respectively connected to the radially inner ends 38i of the first inner side connection coils 38 exposed in the fourth left inner side coil unit 74.

Next, the seven first left inner side coil units 71 are sequentially disposed to be adjacent to one another in the clockwise direction. The other ends of the six first radially outer side coil bars 34o projecting from the insertion holes 75f of the unit located in the counterclockwise direction are connected to the radially inner ends 37i of the first outer side connection coils 37 and while the other ends of the six first radially outer side coil bars 34o projecting from the left side surface of the stator core 20 are being inserted into the insertion holes 75f to project, the other ends of the first radially inner side coil bars 34i are connected to the radially inner ends 38i of the first inner side connection coils 38.

Finally, the third left inner side coil unit 73 is disposed and the other ends of the first radially outer side coil bars 34o projecting from the insertion holes 75f of the first left inner side coil units 71 assembled last are connected to the radially inner ends 37i of the first outer side connection coils 37 exposed in the third left inner side coil unit 73. The third left inner side coil unit 73 is overlapped with the second left inner side coil unit 72 and the radially outer ends 38o of the first inner side connection coils 38 of the second left inner side coil unit 72 are connected to the radially outer ends 37o of the first outer side connection coils 37 of the third left inner side coil unit 73.

Accordingly, the left inner side base plate assembly 70 is annually disposed to the axially left side of the stator core 20.

7-4. Assembling of Left Outer Side Base Plate Assembly

Next, as shown in FIG. 9, the left outer side base plate assembly 80 is assembled to the axially left side of the left inner side base plate assembly 70. The left outer side base plate assembly 80 is assembled in the counterclockwise direction in the order of the second left outer side coil unit 82, the fourth left outer side coil unit 84, the first left outer side coil unit 81, and the third left outer side coil unit 83.

Specifically, first, the second left outer side coil unit 82 is disposed at a predetermined position to be overlapped with the left inner side base plate assembly 70. The other ends of the six second radially outer side coil bars 54o projecting from the left side surface of the stator core 20 are allowed to pass through the insertion holes 85f of the second left outer side coil unit 82 to project, and the other ends of the six second radially inner side coil bars 54i are connected to the radially inner ends 58i of the second inner side connection coils 58 exposed in the second left outer side coil unit 82.

The fourth left outer side coil unit 84 is disposed to be adjacent to the second left outer side coil unit 82 in the counterclockwise direction. At this time, the circumferential phases of the fourth left inner side coil unit 74 and the fourth left outer side coil unit 84 are matched. The other ends of the plural second radially outer side coil bars 54o brought into abutment with the radially inner ends 57i of the second outer side connection coils 57 of the fourth left outer side coil unit 84 are respectively connected to the radially inner ends 57i of the second outer side connection coils 57, and the second radially inner side coil bars 54i projecting from the left side surface of the stator core 20 are connected to the radially inner ends 58i of the second inner side connection coils 58 exposed in the fourth left outer side coil unit 84.

Next, the seven first left outer side coil units 81 are sequentially disposed to be adjacent to one another in the counterclockwise direction. The other ends of the six second radially outer side coil bars 54o projecting from the insertion holes 85f of the unit located in the clockwise direction are connected to the radially inner ends 57i of the second outer side connection coils 57 and while the other ends of the six second radially outer side coil bars 54o projecting from the left side surface of the stator core 20 are being inserted into the insertion holes 85f to project, the other ends of the second radially inner side coil bars 54i are connected to the radially inner ends 58i of the second inner side connection coils 58.

Finally, the third left outer side coil unit 83 is disposed and the other ends of the second radially outer side coil bars 54o projecting from the insertion holes 85f of the first left outer side coil unit 81 that is last assembled are connected to the radially, inner ends 57i of the second outer side connection coils 57 exposed in the third left outer side coil unit 83. The third left outer side coil unit 83 is overlapped with the second left outer side coil unit 82 and the radially outer ends 58o of the second inner side connection coils 58 of the second left outer side coil unit 82 are connected to the radially outer ends 57o of the second outer side connection coils 57 of the third left outer side coil unit 83.

Accordingly, the left outer side base plate assembly 80 is annually disposed to the axially left side of the left inner side base plate assembly 70.

In this manner, when the right inner side base plate assembly 30 and the right outer side base plate assembly 50 are assembled to the axially right side of the stator core 20 and the left inner side base plate assembly 70 and the left outer side base plate assembly 80 are further assembled to the axially left side of the stator core 20, as shown in FIGS. 15 and 16, the pair of left and right first inner side connection coils 38 are connected by the first radially inner side coil bars 34i and the pair of left and right first outer side connection coils 37 are connected by the first radially outer side coil bars 34o. The pair of left and right second inner side connection coils 58 are connected by the second radially inner side coil bars 54i and the pair of left and right second outer side connection coils 57 are connected by the second radially outer side coil bars 54o so as to form a coil 90. For example, the first coil bar 34 and the second coil bar 54, which are disposed in the same slot 21, constitute the same phase such as a U phase and a current flows in the same direction. Although the detailed description of the connection state of the coil 90 is omitted, the coil 90 includes coil loops of U phase, V phase, and W phase and the coil loops of three phases are star connected at the middle point busbar 89M.

As described above, in the stator 10 for a rotary electric machine according to the embodiment, the coil 90 has the plural first coil bars 34 which are inserted into the slots 21, and the plural first outer side connection coils 37 and the plural first inner side connection coils 38 which connect the first coil bars 34 on the axially outer side of the stator core 20. The first outer side connection 7 and the first inner side connection coil 38 are disposed to cross each other on planes which are disposed in different axial positions, and the left inner side base plate assembly 70 is provided on the axially outer side of the stator core 20. The left inner side base plate assembly 70 has the plural first left inner side coil units 71 in which the first inner side connection coils 38 and the first outer side connection coils 37 are integrally formed with the first left inner side divided plate 75, the second left inner side coil unit 72 in which the first inner side connection coils 38 are integrally formed with the second left inner side divided plate 76 which is provided to extend on the plane on which first inner side connection coils 38 are disposed, and the third left inner side coil unit 73 in which the first outer side connection coils 37 are integrally formed with the third left inner side divided plate 77 which is provided to extend on the plane on which the first outer side connection coils 37 are disposed.

In this manner, since the left inner side base plate assembly 70 is made up of the plural first left inner side coil units 71, the second left inner side coil unit 72, and the third left inner side coil unit 73, compared to the ease in which the base plate is molded at once as in the related art, a large scale manufacturing facility is not required and the base plate can be easily manufactured. In the case where the plural first left inner side coil units 71 are simply disposed in the circumferential direction, when the last first left inner side coil unit 71 is disposed, the last first left inner side coil unit 71 interferes with the first left inner side coil unit 71 that is first disposed and thus the last first left inner side coil unit 71 cannot be assembled. However, the second left inner side coil unit 72 which is provided to extend on the plane on which the first inner side connection coils 38 are disposed is disposed before the first left inner side coil unit 71 is disposed, and the third left inner side coil unit 73 which is provided to extend on the plane on which the first outer side connection coils 37 are disposed is last disposed, thereby making it possible to easily assemble the left inner side base plate assembly 70.

Since not only the left inner side base plate assembly 70, but also the right inner side base plate assembly 30 is made up of the first right inner side coil unit 35, the second right inner side coil unit 41, and the third right inner side divided plate 46, the base plate assembly can be provided at the both axial ends of the stator core 20 and thus the stator 10 for a rotary electric machine can be easily manufactured while sharing the constitution components.

In the right inner side base plate assembly 30, since the first coil bar 34 is integrally formed with the first right inner side coil unit 35, connection processing is not required after the first outer side connection coils 37, the first inner side connection coils 38, and the first coil bar 34 are assembled and thus the stator 10 for a rotary electric machine can be more easily manufactured. The right outer side base plate assembly 50 and the left outer side base plate assembly 80 may be omitted and in a case in which the right outer side base plate assembly 50 and the left outer side base plate assembly 80 are provided, as in the embodiment, the right outer side base plate assembly 50 is configured similarly to the right inner side base plate assembly 30 and the left outer side base plate assembly 80 is configured similarly to the left inner side base plate assembly 70. Thus, the stator 10 for a rotary electric machine can be easily manufactured.

In the example of the left inner side base plate assembly 70, since the first inner side connection coils 38 are inserted into the coil grooves 75c and the first outer side connection coils 37 are inserted into the coil grooves 75d, the first inner side connection coils 38 and the first outer side connection coils 37 can be effectively cooled by making a cooling medium flow along these coil grooves 75c and 75d, thereby making it possible to prevent deterioration in the performance of a rotary electric machine due to an increase in coil temperature.

The invention is not limited to the above-described embodiment and may be appropriately changed or improved.

For example, in the example of the right inner side base plate assembly 30, in the embodiment, one second right inner side coil assembly 32 and one third right inner side coil assembly 33 are disposed between the adjacent first right inner side coil assemblies 31. However, for example, two second right inner side coil assemblies 32 and two third right inner side coil assemblies 33 may be respectively disposed between the adjacent first right inner side coil assemblies 31 (for example, at a position of 180°), and three or more second right inner side coil assemblies 32 and three or more third right inner side coil assemblies 33 may be respectively disposed between the adjacent first right inner side coil assemblies 31. The same is applied to the right outer side base plate assembly 50, the left inner side base plate assembly 70, and the left outer side base plate assembly 80.

The invention claimed is:

1. A stator for an electric rotary machine comprises:
    a stator core having plural slots; and
    a coil attached to the stator core, wherein
        the coil has plural slot coils inserted into the slots, and plural connection coils connecting the slot coils on an axially outer side from an axial end surface of the stator core,
        the plural connection coils have an inner side connection coil and an outer side connection coil disposed to cross each other on planes which are disposed in different axial positions,
        a base plate assembly is provided on at least axial one end side of the stator core, and
        the base plate assembly has
            plural first coil units disposed in a circumferential direction such that the inner side connection coil and the outer side connection coil are integrally formed with a first divided plate having adjacent plate portions that are overlapped with each other in an axial direction,
            at least one second coil unit provided between adjacent coil units of the plural first coil units, in which the inner side connection coil is integrally formed with a second divided plate provided to extend on the plane on which the inner side connection coil is disposed, and
            at least one third coil unit provided between adjacent coil units of the first coil units, in which the outer side connection coil is integrally formed with a third divided plate provided to extend on the plane on which the outer side connection coil is disposed.

2. The stator for an electric rotary machine according to claim 1, wherein
    a shape formed by combining the second divided plate and the third divided plate is substantially the same as a shape of the first divided plate.

3. The stator for an electric rotary machine according to claim 1, wherein
    the base plate assembly is provided on both axial sides of the stator core.

4. The stator for an electric rotary machine according to claim 3, wherein
    the slot coils are integrally formed with the first to third coil units of the base plate assembly provided on axial other end side of the stator core.

5. The stator for an electric rotary machine according to claim 1, wherein
    in the first divided plate, an outer side groove portion is formed such that the outer side connection coil is exposed to an outer surface and an inner side groove portion is formed such that the inner side connection coil is exposed to an inner surface,
    in the second divided plate, an inner side groove portion is formed such that the inner side connection coil is exposed to an inner surface, and
    in the third divided plate, an outer side groove portion is formed such that the outer side connection coil is exposed to an outer surface.

* * * * *